(12) United States Patent
Sakamura et al.

(10) Patent No.: US 7,403,924 B2
(45) Date of Patent: Jul. 22, 2008

(54) COMMUNICATION TERMINAL, PORTABLE TERMINAL, CIRCULATING SERVER, PROVIDING SERVER, ELECTRONIC BOOK DISTRIBUTING METHOD, AND ELECTRONIC BOOK DISTRIBUTING PROGRAM

(75) Inventors: Ken Sakamura, 4-9-2, Osaki, Shinagawa-ku, Tokyo 141-0032 (JP); Noboru Koshizuka, 2-27-20, Nishikubo, Musashino-shi, Tokyo 180-0013 (JP); Hiroshi Aono, Yokosuka (JP); Kazuhiko Ishii, Yokohama (JP); Kensaku Mori, Yokohama (JP); Sadayuki Hongo, Yokohama (JP)

(73) Assignees: NTT DoCoMo, Inc., Tokyo (JP); Ken Sakamura, Tokyo (JP); Noboru Koshizuka, Tokyo (JP)

( * ) Notice: Subject to any disclaimer, the term of this patent is extended or adjusted under 35 U.S.C. 154(b) by 366 days.

(21) Appl. No.: 10/441,162

(22) Filed: May 20, 2003

(65) Prior Publication Data

US 2004/0153422 A1 Aug. 5, 2004

(30) Foreign Application Priority Data

May 20, 2002 (JP) .......................... P2002-145037
May 20, 2002 (JP) .......................... P2002-145045

(51) Int. Cl.
*G06Q 99/00* (2006.01)

(52) U.S. Cl. .............................. 705/52; 705/51; 705/65; 705/71; 726/30; 380/200

(58) Field of Classification Search ................... 705/26, 705/50–59, 71, 24; 707/4, 9, 10; 380/200–203; 725/60; 726/26–33

See application file for complete search history.

(56) References Cited

U.S. PATENT DOCUMENTS

| | | | | |
|---|---|---|---|---|
| 5,532,920 A | * | 7/1996 | Hartrick et al. | 705/52 |
| 5,892,900 A | * | 4/1999 | Ginter et al. | 726/26 |
| 5,986,690 A | * | 11/1999 | Hendricks | 725/60 |
| 6,385,614 B1 | * | 5/2002 | Vellandi | 707/9 |

(Continued)

FOREIGN PATENT DOCUMENTS

EP 1 045 321 A2 10/2000

(Continued)

OTHER PUBLICATIONS

A. K. Choudhury, et al., IEEE Network, vol. 9, No. 3, XP-000505280, pp. 12-20, "Copyright Protection for Electronic Publishing Over Computer Networks", May/Jun. 1995.

*Primary Examiner*—Jalatee Worjloh
(74) *Attorney, Agent, or Firm*—Oblon, Spivak, McClelland, Maier & Neustadt, P.C.

(57) ABSTRACT

A portable terminal 20 according to the present invention is provided with an electronic book coupon storage 22, a book data receiver 24, an electronic book coupon deductor 25, and a book data decryptor 26. The electronic book coupon storage 22 stores an electronic book coupon used in acquisition of book data containing a plurality of page data units, along with a decryption key used in decryption of the plurality of page data units. The book data receiver 24 receives the book data from an electronic book providing server 30. The electronic book coupon deductor 25 deducts an electronic worth equivalent to a price according to page data requested to be readout, from the electronic book coupon. The book data decryptor 26 decrypts the page data in steps of one page data unit by use of the decryption key in conjunction with the deduction of the electronic worth.

11 Claims, 12 Drawing Sheets

U.S. PATENT DOCUMENTS

| | | | |
|---|---|---|---|
| 6,434,535 B1* | 8/2002 | Kupka et al. | 705/24 |
| 6,453,305 B1* | 9/2002 | Glassman et al. | 705/59 |
| 6,633,877 B1* | 10/2003 | Saigh et al. | 380/201 |
| 6,647,411 B2* | 11/2003 | Towell et al. | 709/213 |
| 6,704,733 B2* | 3/2004 | Clark et al. | 707/10 |
| 6,886,036 B1* | 4/2005 | Santamaki et al. | 707/4 |
| 6,895,393 B1* | 5/2005 | Numata et al. | 705/52 |
| 7,013,296 B1* | 3/2006 | Yemini et al. | 705/77 |
| 2001/0011234 A1* | 8/2001 | Kim | 705/26 |
| 2001/0011238 A1 | 8/2001 | Eberhard et al. | |
| 2001/0051926 A1* | 12/2001 | Wang | 705/51 |
| 2002/0112172 A1* | 8/2002 | Simmons | 380/201 |
| 2002/0159589 A1* | 10/2002 | She et al. | 380/37 |
| 2007/0073624 A1* | 3/2007 | Ishibashi et al. | 705/53 |

FOREIGN PATENT DOCUMENTS

| | | |
|---|---|---|
| EP | 1 045320 A2 | 10/2000 |
| JP | 2000-285174 A | 10/2000 |
| JP | 2001-92721 | 4/2001 |
| JP | 2002-032668 A | 1/2002 |
| JP | 2002-41994 | 2/2002 |
| JP | 2002-109398 A | 4/2002 |
| KR | 20-0171103 | 12/1999 |
| KR | 2002-0003115 | 1/2002 |
| WO | WO 98/08344 | 2/1998 |
| WO | WO 00/23926 | 4/2000 |
| WO | WO 01/18984 | 3/2001 |

* cited by examiner

Fig.5

| ELECTRONIC BOOK ID | ALREADY-READ PAGES | BILL(¥) |
|---|---|---|
| 00001 | 1, 2, 3, 4, 5 | 7.5 |
| 00002 | 1, 2, 3 | 3.5 |
| 00004 | 1, 2, 3, 4 | 6.0 |

Fig.6

141a — ELECTRONIC BOOK ID 00001
141b — BILLING DATE

| BILLING DATE | ALREADY-READ PAGES | BILL(¥) |
|---|---|---|
| 02.02.27 | 1,2,3,4,5 | 7.5 |
| 02.02.28 | 1,2,3 | 4.5 |
| 02.03.04 | 1,2,3,4 | 6.0 |
| | COLLECTED AMOUNT(¥) | 18.0 |

| ELECTRONIC BOOK ID | ALREADY-USED DECRYPTION KEYS | BILL(¥) |
|---|---|---|
| 00001 | A1, A2, A3, A4, A5 | 7.5 |
| 00002 | B1, B2, B3 | 3.5 |
| 00004 | D1, D2, D3, D4 | 6.0 |

| | | | | | |
|---|---|---|---|---|---|
| | | ELECTRONIC BOOK ID | 142c 03 | 142d | |
| | ELECTRONIC BOOK ID | 02 | DATE | ALREADY-USED | BILL(¥) |
| 142a | ELECTRONIC BOOK ID 00001 | DATE | ALREADY-USED | BILL(¥) | 18.4 |
| 142b | BILLING DATE | ALREADY-USED DECRYPTION KEYS | BILL(¥) | | 3.5 5.5 |
| | 02.02.27 | A1,A2,A3,A4,A5 | 7.5 | 12.5 | (¥) |
| | 02.02.28 | A1,A2,A3 | 4.5 | 31.0 | |
| | 02.03.04 | A1,A2,A3,A4 | 6.0 | | (¥) |
| | | COLLECTED AMOUNT(¥) 18.0 | | | 142e |

COMMUNICATION TERMINAL, PORTABLE TERMINAL, CIRCULATING SERVER, PROVIDING SERVER, ELECTRONIC BOOK DISTRIBUTING METHOD, AND ELECTRONIC BOOK DISTRIBUTING PROGRAM

BACKGROUND OF THE INVENTION

1. Field of the Invention

The present invention relates to a communication terminal, a portable terminal, a circulating server, a providing server, an electronic book distributing method, and an electronic book distributing program.

2. Related Background Art

In recent years, electronic books (also called e-books (trademark)), which are superior in portability and searchability to books of paper media and which can contain records of sound, are in practical use. The electronic books are digitized books which can be purchased and read by use of such terminals as personal computers and PDAs (Personal Digital Assistances). The electronic books are roughly classified into two types depending upon provided forms, a package type in which book data is stored in a recording medium such as a CD-ROM, an FD, or the like, and a network type in which book data is transmitted and received through networks such as the Internet.

Particularly, the following operation form is the mainstream about the electronic books of the network type. Namely, a user of a portable terminal purchases an electronic book coupon from a circulating server managed by an issuer of the book coupon. Then the user uses the electronic book coupon thus purchased to download a desired electronic book from a providing server managed by a publisher of the electronic book, into the portable terminal. The portable terminal displays the electronic book thus downloaded, whereby the user can read it.

SUMMARY OF THE INVENTION

In the above prior art, however, the electronic books were distributed in book units (volume units), and it was easy to collect royalties and sales fees according to the number of volumes sold; on the other hand there was the problem as described below. Namely, the users were not allowed to download and read the electronic books in desired component units (page units, chapter units, etc.). For example, there are cases where a user downloads all pages of an electronic book before reading but discontinues the reading in midstream. In such cases, the user is charged even for pages that have not been read yet, so as to waste the electronic book coupon.

In view of the above problem, an object of the present invention is therefore to provide a communication terminal, a portable terminal, a circulating server, a providing server, an electronic book distributing method, and an electronic book distributing program permitting acquisition of an electronic book in component units and thereby achieving improved convenience in use of the electronic book.

In order to solve the above problem, a communication terminal according to the present invention is a communication terminal comprising: electronic value storing means for storing an electronic value used in acquisition of book data containing a plurality of component data units, along with a decryption key used in decryption of the plurality of component data units; book data receiving means for receiving the book data from a providing server; deducting means for, in accordance with a readout request for readout of component data in the book data received by the book data receiving means, deducting an electronic worth equivalent to a price according to the component data requested to be read out, in steps of an electronic worth equivalent to a price of one component data unit (atomically) from the electronic value; and component data decrypting means for decrypting the component data in steps of one component data unit (atomically) by use of the decryption key in conjunction with the deduction of the electronic worth equivalent to the price according to the component data by the deducting means.

Here, the communication terminal is enough to be an information apparatus which has the communication function, such as a desktop personal computer, a notebook personal computer, PDA, a portable telephone, etc.

In the case that the communication terminal is one (portable terminal) that can be carried for example, a portable terminal according to the present invention is a portable terminal comprising: electronic value storing means for storing an electronic value used in acquisition of book data containing a plurality of component data units, along with a decryption key used in decryption of the plurality of component data units; book data receiving means for receiving the book data from a providing server; deducting means for, in accordance with a readout request for readout of component data in the book data received by the book data receiving means, deducting an electronic worth equivalent to a price according to the component data requested to be read out, in steps of an electronic worth equivalent to a price of one component data unit (atomically) from the electronic value; and component data decrypting means for decrypting the component data in steps of one component data unit (atomically) by use of the decryption key in conjunction with the deduction of the electronic worth equivalent to the price according to the component data by the deducting means.

An electronic book distributing method according to the present invention is an electronic book distributing method for a portable terminal to handle information, the electronic book distributing method comprising: an electronic value storing step of storing in storing means an electronic value used in acquisition of book data containing a plurality of component data units, along with a decryption key used in decryption of the plurality of component data units; a book data receiving step of receiving the book data from a providing server; a deducting step of, in accordance with a readout request for readout of component data in the book data received in the book data receiving step, deducting an electronic worth equivalent to a price according to the component data requested to be read out, in steps of an electronic worth equivalent to a price of one component data unit from the electronic value; and a component data decrypting step of decrypting the component data in steps of one component data unit by use of the decryption key in conjunction with the deduction of the electronic worth equivalent to the price according to the component data in the deducting step.

An electronic book distributing program according to the present invention is an electronic book distributing program for letting a portable terminal execute the following processes: an electronic value storing process of storing in storing means an electronic value used in acquisition of book data containing a plurality of component data units, along with a decryption key used in decryption of the plurality of component data units; a book data receiving process of receiving the book data from a providing server; a deducting process of, in accordance with a readout request for readout of component data in the book data received by the book data receiving process, deducting an electronic worth equivalent to a price according to the component data requested to be read out, in steps of an electronic worth equivalent to a price of one component data unit from the electronic value; and a component data decrypting process of decrypting the component data in steps of one component data unit by use of the decryption key in conjunction with the deduction of the electronic worth equivalent to the price according to the component data by the deducting process.

According to these aspects of the invention, the deduction process is carried out in steps of one component data unit for the book data; i.e., billing is carried out atomically. For this reason, the providing server can provide the electronic book in component units to the portable terminal. Therefore, the user of the portable terminal can purchase and read only desired component units (pages or chapters). It is also feasible to avoid the billing of fees even for component data units that the user does not desire to purchase and read in the book data acquired and, thereby, to reduce the waste of the electronic value. As a result, the convenience is enhanced in use of the electronic book.

Furthermore, the book data is encrypted in component data units being the components thereof and, in order to decrypt each component data unit, an electronic worth equivalent to a price according to each decrypted component data unit is automatically deducted from the electronic value. For this reason, billing takes place inevitably on the occasion of decryption and display of each component data unit, so that it is feasible to prevent unauthorized copy and unreasonable billing of component data.

The communication terminal according to the present invention is preferably constructed in a configuration further comprising electronic value receiving means for receiving the electronic value along with the decryption key from a circulating server, wherein the electronic value storing means stores the electronic value and the decryption key received by the electronic value receiving means.

The portable terminal according to the present invention is preferably constructed in a configuration further comprising electronic value receiving means for receiving the electronic value along with the decryption key from a circulating server, wherein the electronic value storing means stores the electronic value and the decryption key received by the electronic value receiving means.

The circulating server according to the present invention comprises electronic value storing means for storing an electronic value along with a decryption key; and electronic value transmitting means for transmitting the electronic value along with the decryption key to the communication terminal described above.

The circulating server according to the present invention comprises electronic value storing means for storing an electronic value along with a decryption key; and electronic value transmitting means for transmitting the electronic value along with the decryption key to the portable terminal described above.

The electronic book distributing method according to the present invention is preferably configured as a method further comprising an electronic value receiving step of receiving the electronic value along with the decryption key from a circulating server, wherein the electronic value storing step is configured to store in the storing means the electronic value and the decryption key received in the electronic value receiving step.

The electronic book distributing method according to the present invention is preferably an electronic book distributing method for a circulating server to handle information, the method comprising an electronic value transmitting step of transmitting the electronic value along with the decryption key to the aforementioned portable terminal.

According to these aspects of the invention, the portable terminal receives the electronic value transmitted from the circulating server. Accordingly, the user of the portable terminal can easily and quickly acquire the electronic value through a network.

Furthermore, in the portable terminal according to the present invention, preferably, the book data receiving means receives the book data in steps of one component data unit from the providing server.

Furthermore, in the providing server according to the present invention, preferably, the book data transmitting means transmits the book data in steps of one component data unit to the portable terminal.

Furthermore, in the electronic book distributing method according to the present invention, preferably, the book data transmitting step is configured so that the proving server transmits the book data in steps of one component data unit to the portable terminal.

According to these aspects of the invention, the book data transmitted from the providing server to the portable terminal is not received the entire volume at a time, but is received in the form of divided data in component units. The portable terminals have the smaller capacity of available radio resources and the smaller volume of data processable or storable at a time than such terminal equipment as personal computers. For this reason, the bulk download of large-volume data like the book data of full volume is not practical in view of the communication load on mobile communication networks and the processing power of the portable terminals. Therefore, the appropriate segmentation of the received book data can implement reduction of the communication load and reception of data in volume suitable for the processing power.

The portable terminal according to the present invention is more preferably constructed in a configuration further comprising bill information transmitting means for transmitting information for specifying the component data and the price, as bill information to the circulating server.

The circulating server according to the present invention is preferably a circulating server comprising: bill information receiving means for receiving the bill information from the portable terminal as set forth; and bill information storing means for storing the bill information received by the bill information receiving means, in correspondence to identification information of the portable terminal.

The electronic book distributing method according to the present invention is more preferably configured as a method further comprising a bill information transmitting step of transmitting information for specifying the component data and the price, as bill information to the circulating server.

The electronic book distributing method according to the present invention is more preferably an electronic book distributing method for a circulating server to handle information, the electronic book distributing method comprising: a bill information receiving step of receiving the bill information from the portable terminal as set forth; and a bill information storing step of storing in storing means the bill information received in the bill information receiving step, in correspondence to identification information of the portable terminal.

According to these aspects of the invention, the bill information is transmitted from the portable terminal to the circulating server. The bill information is information including at least information for specifying the decrypted component data and information for specifying the price deducted from the electronic value prior to the decryption of the component data. Accordingly, the portable terminal can readily notify the circulating server of the information necessary for adequate allocation of a profit made with distribution of the electronic book. As a result, the circulating server can adequately allocate the profit to a distributor, a publisher, an author, etc. of the electronic book on the basis of the foregoing information.

The circulating server according to the present invention is more preferably a circulating server comprising: bill information receiving means for receiving the bill information from the portable terminal as set forth; collection information storing means for storing a collected bill payment for each mentioned book data in correspondence to the bill information received by the bill information receiving means, as collection information; and profit allocating means for allocating the collected bill payment at a predetermined ratio on the basis of the collection information stored in the collection information storing means.

The electronic book distributing method according to the present invention is more preferably an electronic book distributing method for a circulating server to handle information, the electronic book distributing method comprising: a bill information receiving step of receiving the bill information from the portable terminal as set forth; a collection information storing step of storing in storing means a collected bill payment for each mentioned book data in correspondence to the bill information received in the bill information receiving step, as collection information; and a profit allocating step of allocating the collected bill payment at a predetermined ratio on the basis of the collection information stored in the collection information storing step.

According to these aspects of the invention, the allocation of the collected bill payment is carried out at least on the basis of the collection information of the correspondence between the bill information transmitted from the portable terminal to the circulating server and the collected bill payment for each book data. Since the collected bill payment is counted for each book data, it is easy to calculate the profit to be paid out to the administrator of the circulating server and to the author and provider of the book data (electronic book) and to specify allocation receivers. The management of collected bill payment for each book data is particularly effective in the case where there is a number of book data to be distributed and where authors and publishers are different among the book data. This makes it feasible to readily and quickly perform appropriate profit allocation with distribution of book data.

In the portable terminal according to the present invention, preferably, the bill information transmitting means transmits the bill information to the circulating server in conjunction with a charge request for charging of the electronic value to the circulating server.

In the electronic book distributing method according to the present invention, preferably, the bill information transmitting step is configured to transmit the bill information to the circulating server in conjunction with a charge request for charging of the electronic value to the circulating server.

According to these aspects of the invention, the bill information is transmitted from the portable terminal to the circulating server in conjunction with the charge request for charging of the electronic value to the circulating server. This makes it feasible to surely and collectively perform the profit allocation according to the electronic worth used between acquisition and charging of the electronic value.

The portable terminal according to the present invention is more preferably constructed in a configuration further comprising charge information receiving means for receiving charge information for charging of the electronic value from the circulating server, wherein the electronic value is charged based on the charge information received by the charge information receiving means.

The electronic book distributing method according to the present invention is more preferably configured as a method further comprising a charge information receiving step of receiving charge information for charging of the electronic value from the circulating server, wherein the electronic value is charged based on the charge information received in the charge information receiving step.

According to these aspects of the invention, the charge information transmitted from the circulating server is received by the portable terminal. The electronic value is charged based on the received charge information. Accordingly, the user of the portable terminal can readily and quickly replenish the electronic value through the network when the remainder of the electronic value becomes small, and then the user can purchase a desired electronic book.

In the portable terminal according to the present invention, more preferably, the component data units are page data units.

In the electronic book distributing method according to the present invention, more preferably, the component data units are page data units.

According to these aspects of the invention, the deduction process, i.e., billing is performed in page data units for the book data. For this reason, the providing server can provide the electronic book in page units. Therefore, the user of the portable terminal can purchase and read only desired pages. Namely, the user of the portable terminal is allowed to finely select desired portions to be purchased and read, out of the book data. The user is not charged for page data that the user does not desire to purchase and read in the acquired book data, so as to reduce the waste of the electronic value. As a result, the convenience is enhanced more in use of the electronic book.

In the circulating server according to the present invention, more preferably, the electronic value is an electronic book coupon.

In the electronic book distributing method according to the present invention, more preferably, the electronic value is an electronic book coupon. The electronic value may be electronic money, or an electronic ticket as an electronic data form of a commuter pass, a ticket, or the like.

When the user of the portable terminal purchases an electronic book, the electronic book is intended as an object for purchase, as a matter of course, and it is often the case that the user uses an electronic book coupon with less concern about unauthorized use than the electronic money. When the circulating server circulates such electronic book coupons, it is feasible to promote the sale of electronic books more safely and efficiently.

The providing server according to the present invention comprises book data transmitting means for transmitting the book data to the aforementioned communication terminal.

The providing server according to the present invention comprises book data transmitting means for transmitting the book data to the aforementioned portable terminal.

The electronic book distributing method according to the present invention is preferably an electronic book distributing method for a providing server to handle information, the method comprising a book data transmitting step of transmitting the book data to the aforementioned portable terminal.

The providing server according to the present invention is preferably constructed in a configuration further comprising book data encrypting means for encrypting the plurality of component data units in the book data, in steps of one component data unit.

The electronic book distributing method according to the present invention is preferably configured as a method further comprising a book data encrypting step of encrypting the plurality of component data units in the book data, in steps of one component data unit.

According to these aspects of the invention, the book data transmitted to the portable terminal is encrypted in steps of one component data unit. Accordingly, it is feasible to ensure high security in distribution of book data and implement billing in component units for the electronic book.

The portable terminal according to the present invention is more preferably constructed in a configuration wherein the decryption key is used in decryption of a decryption key for decryption of the plurality of component data units, and wherein, in conjunction with the deduction of the electronic worth according to the component data by the deducting means, the component data decrypting means decrypts the decryption key for decryption of the component data units in steps of one component data unit by use of the decryption key and decrypts the component data in steps of one component data unit.

The providing server according to the present invention is more preferably constructed in a configuration further comprising decryption key encrypting means for encrypting a plurality of decryption keys for decryption of the plurality of component data units in the book data.

The electronic book distributing method according to the present invention is more preferably configured as a method wherein the decryption key is used in decryption of a decryption key for decryption of the plurality of component data units, and wherein the component data unit decrypting step is configured to, in conjunction with the deduction of the electronic worth according to the component data in the deducting step, decrypt the decryption key for decryption of the component data units in steps of one component data unit by use of the decryption key and decrypt the component data in steps of one component data unit.

The electronic book distributing method according to the present invention is more preferably configured as a method further comprising a decryption key encrypting step of encrypting a plurality of decryption keys for decryption of the plurality of component data units in the book data.

According to these aspects of the invention, the book data is encrypted in component data units being components of the data and, for decryption of each component data unit, the electronic worth equivalent to the price according to the decrypted component data unit is automatically deducted from the electronic value. For this reason, billing takes place inevitably for the decryption and display of each component data unit and it is thus feasible to prevent unauthorized copy and unreasonable billing of component data.

It is a matter of course that the plurality of component data units constituting the book data are encrypted, and a plurality of decryption keys for decryption of the plurality of encrypted component data units are also encrypted each by an encryption key. Namely, the component data units transmitted and received between the providing server and the portable terminal are doubly encrypted. Accordingly, the security level for the book data is raised more.

Preferably, the electronic value storing means of the portable terminal according to the present invention is comprised of a tamper-resistant device, and the component data decrypting means decrypts the component data units in steps of one component data unit inside the electronic value storing means.

According to the present invention, the plurality of component data units, i.e., the book data is decrypted in steps of one component data unit inside the tamper-resistant device, using the decryption key stored in the tamper-resistant device. Accordingly, higher security can be ensured than in the case where the data is decrypted inside application software such as dedicated browser software or inside hardware equipped with an IC card reader.

Preferably, the electronic value storing means of the circulating server according to the present invention is comprised of a tamper-resistant device, and the electronic value is transmitted and received between the electronic value storing means and the electronic value storing means of the portable terminal according to the present invention, in conformity to a protocol defined between the circulating server and the portable terminal.

According to the present invention, the electronic value is transmitted and received between the electronic value storing means of the circulating server and the electronic value storing means of the portable terminal in conformity to the protocol defined between the circulating server and the portable terminal, and is thus always present only within these storage means. The storage means both are tamper-resistant devices, and it is thus feasible to prevent injustices such as leakage, falsification, etc. of the data in the electronic value by a third person. As a result, it is feasible to ensure high confidentiality and reliability of the electronic value.

The invention may also be applied to construction and operation of an electronic book distributing system comprising the foregoing portable terminal, the foregoing circulating server, and the foregoing providing server and configured to implement communication between the portable terminal and the circulating server and communication between the portable terminal and the providing server.

In the construction and operation of the electronic book distributing system, preferably, the system is comprised of the foregoing portable terminal and the foregoing providing server, and the decryption key stored in the electronic value storing means of the portable terminal is different from the encryption key used in encryption by the book data encrypting means of the providing server.

According to the present invention, the key used in encryption of the book data is different from the key used in decryption of the book data. Namely, the public-key cryptographic scheme is adopted for the encryption and decryption of the book data. The public-key cryptographic scheme has lower degree of necessity for transmitting keys through a safe route and ensures easier management of keys with higher security than the private (common)-key cryptographic scheme. Accordingly, higher security can be ensured about the book data.

In order to solve the above problem, a communication terminal according to the present invention is a communication terminal comprising: electronic value storing means for storing an electronic value used in acquisition of book data containing a plurality of component data units, along with a second decryption key used in decryption of a plurality of first decryption keys which are used in decryption of the plurality of component data units and which are different from each other; book data receiving means for receiving the book data along with the plurality of first decryption keys from a providing server; deducting means for, in accordance with a readout request for readout of component data in the book data received by the book data receiving means, deducting an electronic worth equivalent to a price according to the component data requested to be read out, in steps of an electronic worth equivalent to a price of one component data unit (atomically) from the electronic value; and first decryption key decrypting means for decrypting the plurality of first decryption keys in steps of one first decryption key by use of the second decryption key in conjunction with the deduction of the electronic worth equivalent to the price according to the component data by the deducting means.

Here, the communication terminal is enough to be an information apparatus which has the communication function, such as a desktop personal computer, a notebook personal computer, PDA, a portable telephone, etc.

In the case that the communication terminal is one (portable terminal) that can be carried for example, a portable terminal according to the present invention is a portable terminal comprising: electronic value storing means for storing an electronic value used in acquisition of book data containing a plurality of component data units, along with a second decryption key used in decryption of a plurality of first decryption keys which are used in decryption of the plurality of component data units and which are different from each other; book data receiving means for receiving the book data along with the plurality of first decryption keys from a providing server; deducting means for, in accordance with a readout request for readout of component data in the book data received by the book data receiving means, deducting an electronic worth equivalent to a price according to the component data requested to be read out, in steps of an electronic worth equivalent to a price of one component data unit (atomically) from the electronic value; and first decryption key decrypting means for decrypting the plurality of first decryption keys in steps of one first decryption key by use of the second decryption key in conjunction with the deduction of the electronic worth equivalent to the price according to the component data by the deducting means.

A providing server according to the present invention is a providing server comprising: first decryption key encrypting means for encrypting a plurality of first decryption keys which are used in decryption of a plurality of component data units included in book data and which are different from each other, in steps of one first decryption key; and book data transmitting means for transmitting the book data along with the plurality of first decryption keys encrypted by the first decryption key encrypting means, to the communication terminal as set forth.

A providing server according to the present invention is a providing server comprising: first decryption key encrypting means for encrypting a plurality of first decryption keys which are used in decryption of a plurality of component data units included in book data and which are different from each other, in steps of one first decryption key; and book data transmitting means for transmitting the book data along with the plurality of first decryption keys encrypted by the first decryption key encrypting means, to the portable terminal as set forth.

An electronic book distributing method according to the present invention is an electronic book distributing method for a portable terminal to handle information, the electronic book distributing method comprising: an electronic value storing step of storing in storing means an electronic value used in acquisition of book data containing a plurality of component data units, along with a second decryption key used in decryption of a plurality of first decryption keys which are used in decryption of the plurality of component data units and which are different from each other; a book data receiving step of receiving the book data along with the plurality of first decryption keys from a providing server; a deducting step of, in accordance with a readout request for readout of component data in the book data received in the book data receiving step, deducting an electronic worth equivalent to a price according to the component data requested to be read out, in steps of an electronic worth equivalent to a price of one component data unit from the electronic value; and a first decryption key decrypting step of decrypting the plurality of first decryption keys in steps of one first decryption key by use of the second decryption key in conjunction with the deduction of the electronic worth equivalent to the price according to the component data in the deducting step.

Another electronic book distributing method according to the present invention is an electronic book distributing method for a providing server to handle information, the electronic book distributing method comprising: a first decryption key encrypting step of encrypting a plurality of first decryption keys which are used in decryption of a plurality of component data units included in book data and which are different from each other, in steps of one first decryption key; and a book data transmitting step of transmitting the book data along with the plurality of first decryption keys encrypted in the first decryption key encrypting step, to the portable terminal as set forth.

An electronic book distributing program according to the present invention is an electronic book distributing program for letting a portable terminal execute the following processes: an electronic value storing process of storing in storing means an electronic value used in acquisition of book data containing a plurality of component data units, along with a second decryption key used in decryption of a plurality of first decryption keys which are used in decryption of the plurality of component data units and which are different from each other; a book data receiving process of receiving the book data along with the plurality of first decryption keys from a providing server; a deducting process of, in accordance with a readout request for readout of component data in the book data received by the book data receiving process, deducting an electronic worth equivalent to a price according to the component data requested to be read out, in steps of an electronic worth equivalent to a price of one component data unit, from the electronic value; and a first decryption key decrypting process of decrypting the plurality of first decryption keys in steps of one first decryption key by use of the second decryption key in conjunction with the deduction of the electronic worth equivalent to the price according to the component data by the deducting process.

According to these aspects of the invention, the deduction process is carried out in steps of one component data unit for the book data; i.e., billing is carried out atomically. For this reason, the providing server can provide the electronic book in component units to the portable terminal. Therefore, the user of the portable terminal can purchase and read only desired component units (pages or chapters). It is also feasible to avoid the billing of fees even for component data units that the user does not desire to purchase and read in the book data acquired and, thereby, to reduce the waste of the electronic value. As a result, the convenience is enhanced in use of the electronic book.

The book data is encrypted in component data units being the components thereof, and the plurality of first decryption keys for decryption of the respective component data units are further encrypted one by one. For decryption of each component data unit, an electronic worth equivalent to a price according to the first decryption key to be decrypted is automatically deducted from the electronic value. For this reason, billing takes place inevitably at the time of decryption and display of each component data and it is thus feasible to prevent unauthorized copy and unreasonable billing of component data.

It is also a matter of course that the plurality of component data units constituting the book data are encrypted, and the plurality of first decryption keys for decryption of the plurality of encrypted component data units are also encrypted every first decryption key by an encryption key. Namely, the component data units transmitted and received between the providing server and the portable terminal are doubly encrypted. Furthermore, the plurality of first decryption keys are keys different from each other. Accordingly, the security level about the book data is raised more.

For example, a complex and strong algorithm resistant to crypt analysis is used as an algorithm for encryption or decryption of the first decryption keys, while a simple and easy algorithm relatively easily permitting cryptanalysis is used as an algorithm for encryption or decryption of the component data units. The use of plural encryption algorithms different from each other in this way enables a variety of encryption ways according to combinations thereof. As a consequence, it becomes feasible to implement encryption according to conditions such as required performance, security level, etc. and to enhance flexibility of encryption ways.

The communication terminal according to the present invention is preferably constructed in a configuration further comprising electronic value receiving means for receiving the electronic value along with the second decryption key from a circulating server, wherein the electronic value storing means stores the electronic value and the second decryption key received by the electronic value receiving means.

The portable terminal according to the present invention is preferably constructed in a configuration further comprising electronic value receiving means for receiving the electronic value along with the second decryption key from a circulating server, wherein the electronic value storing means stores the electronic value and the second decryption key received by the electronic value receiving means.

A circulating server according to the present invention is a circulating server comprising: electronic value storing means for storing an electronic value along with a second decryption key; and electronic value transmitting means for transmitting the electronic value along with the second decryption key to the communication terminal as set forth.

A circulating server according to the present invention is a circulating server comprising: electronic value storing means for storing an electronic value along with a second decryption key; and electronic value transmitting means for transmitting the electronic value along with the second decryption key to the portable terminal as set forth.

The electronic book distributing method according to the present invention is preferably configured as a method further comprising an electronic value receiving step of receiving the electronic value along with the second decryption key from a circulating server, wherein the electronic value storing step is configured to store in the storing means the electronic value and the second decryption key received in the electronic value receiving step.

The electronic book distributing method according to the present invention is preferably an electronic book distributing method for a circulating server to handle information, the method comprising an electronic value transmitting step of transmitting the electronic value along with the second decryption key to the aforementioned portable terminal.

According to these aspects of the invention, the portable terminal receives the electronic value transmitted from the circulating server. Accordingly, the user of the portable terminal can easily and quickly acquire the electronic value through a network.

Furthermore, in the portable terminal according to the present invention, preferably, the book data receiving means receives the book data in steps of one component data unit from the providing server.

Furthermore, in the providing server according to the present invention, preferably, the book data transmitting means transmits the book data in steps of one component data unit to the portable terminal.

In the electronic book distributing method according to the present invention, preferably, the book data receiving step is configured so that the portable terminal receives the book data in steps of one component data unit from the providing server.

In the electronic book distributing method according to the present invention, preferably, the book data transmitting step is configured so that the proving server transmits the book data in steps of one component data unit to the portable terminal.

According to these aspects of the invention, the book data transmitted from the providing server to the portable terminal is not received the entire volume at a time, but is received in the form of divided data in component units. The portable terminals have the smaller capacity of available radio resources and the smaller volume of data processable or storable at a time than such terminal equipment as personal computers. For this reason, the bulk download of large-volume data like the book data of full volume is not practical in view of the communication load on mobile communication networks and the processing power of the portable terminals in some cases. Therefore, the appropriate segmentation of the received book data can implement reduction of the communication load and transmission reception of data in the volume suitable for the processing power.

The portable terminal according to the present invention is more preferably constructed in a configuration further comprising bill information transmitting means for transmitting information for specifying the component data and the price, as bill information to the circulating server.

The circulating server according to the present invention is preferably a circulating server comprising: bill information receiving means for receiving the bill information from the portable terminal as set forth; and bill information storing means for storing the bill information received by the bill information receiving means, in correspondence to identification information of the portable terminal.

The electronic book distributing method according to the present invention is more preferably configured as a method further comprising a bill information transmitting step wherein the portable terminal transmits information for specifying the component data and the price, as bill information to the circulating server.

The electronic book distributing method according to the present invention is more preferably an electronic book distributing method for a circulating server to handle information, the electronic book distributing method comprising: a bill information receiving step of receiving the bill information from the portable terminal as set forth; and a bill information storing step of storing in storing means the bill information received in the bill information receiving step, in correspondence to identification information of the portable terminal.

According to these aspects of the invention, the bill information is transmitted from the portable terminal to the circulating server. The bill information is information including at least information for specifying the decrypted component data and information for specifying the price deducted from the electronic value prior to the decryption of the component data. Accordingly, the portable terminal can readily notify the circulating server of the information necessary for adequate allocation of profit made with distribution of the electronic book. As a result, the circulating server can adequately allocate the profit to a publisher, a sales company, an author, etc. of the electronic book on the basis of the foregoing information.

The circulating server according to the present invention is more preferably a circulating server comprising: bill information receiving means for receiving the bill information from the portable terminal as set forth; collection information storing means for storing a collected bill payment for each mentioned book data in correspondence to the bill information received by the bill information receiving means, as collection information; and profit allocating means for allocating the collected bill payment at a predetermined ratio on the basis of the collection information stored in the collection information storing means.

The electronic book distributing method according to the present invention is more preferably an electronic book distributing method for a circulating server to handle information, the electronic book distributing method comprising: a bill information receiving step of receiving the bill information from the portable terminal as set forth; a collection information storing step of storing in storing means a collected bill payment for each mentioned book data in correspondence to the bill information received in the bill information receiving step, as collection information; and a profit allocating step of allocating the collected bill payment at a predetermined ratio on the basis of the collection information stored in the collection information storing step.

According to these aspects of the invention, the allocation of the collected bill payment is carried out on the basis of the collection information of the correspondence between the bill information transmitted from the portable terminal to the circulating server and the collected bill payment for each book data. Since the collected bill payment is counted for each book data, it is easy to calculate the profit to be paid out to the administrator of the circulating server and to the author and provider of the book data (electronic book) and to specify allocation receivers. The management of the collected bill payment for each book data is particularly effective in the case where there is a number of book data to be distributed and where authors and publishers are different among the book data. This makes it feasible to readily and quickly perform appropriate profit allocation with distribution of book data.

In the portable terminal according to the present invention, preferably, the bill information transmitting means transmits the bill information to the circulating server in conjunction with a charge request for charging of the electronic value to the circulating server.

In the electronic book distributing method according to the present invention, preferably, the bill information transmitting step is configured so that the portable terminal transmits the bill information to the circulating server in conjunction with a charge request for charging of the electronic value to the circulating server.

According to these aspects of the invention, the bill information is transmitted from the portable terminal to the circulating server in conjunction with the charge request for charging of the electronic value to the circulating server. The request for charging of electronic value from the portable terminal is often made when the amount of electronic worth in the electronic value becomes small, i.e., when the electronic worth is used up by a considerable amount. Accordingly, the bill information is transmitted from the portable terminal to the circulating server on such occasions, whereby the allocation of the profit according to the electronic worth used between acquisition and charging of the electronic value can be performed securely and collectively. The number of data transmission is as small as one and thus the radio resources can be efficiently used, as compared with the case where the charge request and the bill information item are transmitted independently of each other.

The portable terminal according to the present invention is more preferably constructed in a configuration further comprising charge information receiving means for receiving charge information for charging of the electronic value from the circulating server, wherein the electronic value is charged based on the charge information received by the charge information receiving means.

The electronic book distributing method according to the present invention is more preferably configured as a method further comprising a charge information receiving step wherein the portable terminal receives the charge information for charging of the electronic value from the circulating server, wherein the electronic value is charged based on the charge information received in the charge information receiving step.

According to these aspects of the invention, the charge information transmitted from the circulating server is received by the portable terminal, and the electronic value is charged based on the received charge information. Accordingly, the user of the portable terminal can replenish the electronic value through the network when the remainder of the electronic value becomes small, and then the user can readily and quickly purchase a desired electronic book.

In the portable terminal according to the present invention, more preferably, the component data units are page data units.

In the electronic book distributing method according to the present invention, more preferably, the component data units are page data units.

According to these aspects of the invention, the deduction process, i.e., billing is performed in page data units for the book data. For this reason, the providing server can provide the electronic book in page units. Therefore, the user of the portable terminal can purchase and read only desired pages. Namely, the user of the portable terminal is allowed to finely select desired portions to be purchased and read, out of the book data. The user is not charged for page data that the user does not desire to purchase and read in the acquired book data, so as to reduce the waste of the electronic value. As a result, the convenience is enhanced more in use of the electronic book.

In the circulating server according to the present invention, more preferably, the electronic value is an electronic book coupon.

In the electronic book distributing method according to the present invention, more preferably, the electronic value is an electronic book coupon. The electronic value may be electronic money, or an electronic ticket as an electronic data form of an admission ticket, a traffic ticket, and so on.

When the user of the portable terminal purchases an electronic book, the electronic book is intended as an object for purchase and it is often the case that the user uses an electronic book coupon with less concern about unauthorized use than the electronic money. When the circulating server circulates such electronic book coupons, it is feasible to sell the electronic books more safely and efficiently.

Preferably, the electronic value storing means of the portable terminal according to the present invention is comprised of a tamper-resistant device, and the first decryption key decrypting means decrypts the plurality of first decryption keys in steps of one first decryption key inside the electronic value storing means.

According to the present invention, the plurality of first decryption keys and the plurality of component data units or book data are decrypted every first decryption key inside the tamper-resistant device by use of the second decryption key stored in the tamper-resistant device. Accordingly, higher security can be ensured than in the case where the data is decrypted inside application software such as dedicated browser software or inside hardware equipped with an IC card reader.

Preferably, the electronic value storing means of the circulating server according to the present invention is comprised of a tamper-resistant device, and the electronic value is transmitted and received between the electronic value storing means of the circulating server and the electronic value storing means of the foregoing portable terminal in conformity to a protocol defined between the circulating server and the portable terminal.

According to the present invention, the electronic value is transmitted and received between the electronic value storing means of the circulating server and the electronic value storing means of the portable terminal in conformity to the protocol defined between the circulating server and the portable terminal, and is thus always present within these storage means. The storage means both are the tamper-resistant devices, and it is thus feasible to prevent injustices such as replication, falsification, etc. of the data in the electronic value by a third person. As a result, it is feasible to ensure high security of the electronic value.

The invention may also be applied to construction and operation of an electronic book distributing system comprising the foregoing portable terminal, the foregoing circulating server, and the foregoing providing server and configured to implement communication between the portable terminal and the circulating server and communication between the portable terminal and the providing server.

In the construction and operation of the electronic book distributing system, preferably, the system is comprised of the foregoing portable terminal and the foregoing providing server, and the second decryption key stored in the electronic value storing means of the portable terminal is different from an encryption key used in encryption by the first decryption key encrypting means of the providing server.

According to the present invention, the key used in encryption of the book data is different from the key used in decryption of the book data. Namely, the public-key cryptographic scheme is adopted for the encryption and decryption of the book data. The public-key cryptographic scheme has lower degree of necessity for transmitting keys through a safe route and ensures easier management of keys with higher security than the private (common)-key cryptographic scheme. Accordingly, a higher security level can be ensured about the book data.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a diagram showing a configuration example of the bill information transmitted from the portable terminal.

FIG. 6 is a diagram showing a configuration example of the collection information about portable terminals.

FIG. 10 is a diagram showing a configuration example of the bill information transmitted from the portable terminal.

FIG. 11 is a diagram showing a configuration example of the collection information about portable terminals.

DESCRIPTION OF THE PREFERRED EMBODIMENTS

First Embodiment

Figure 1:
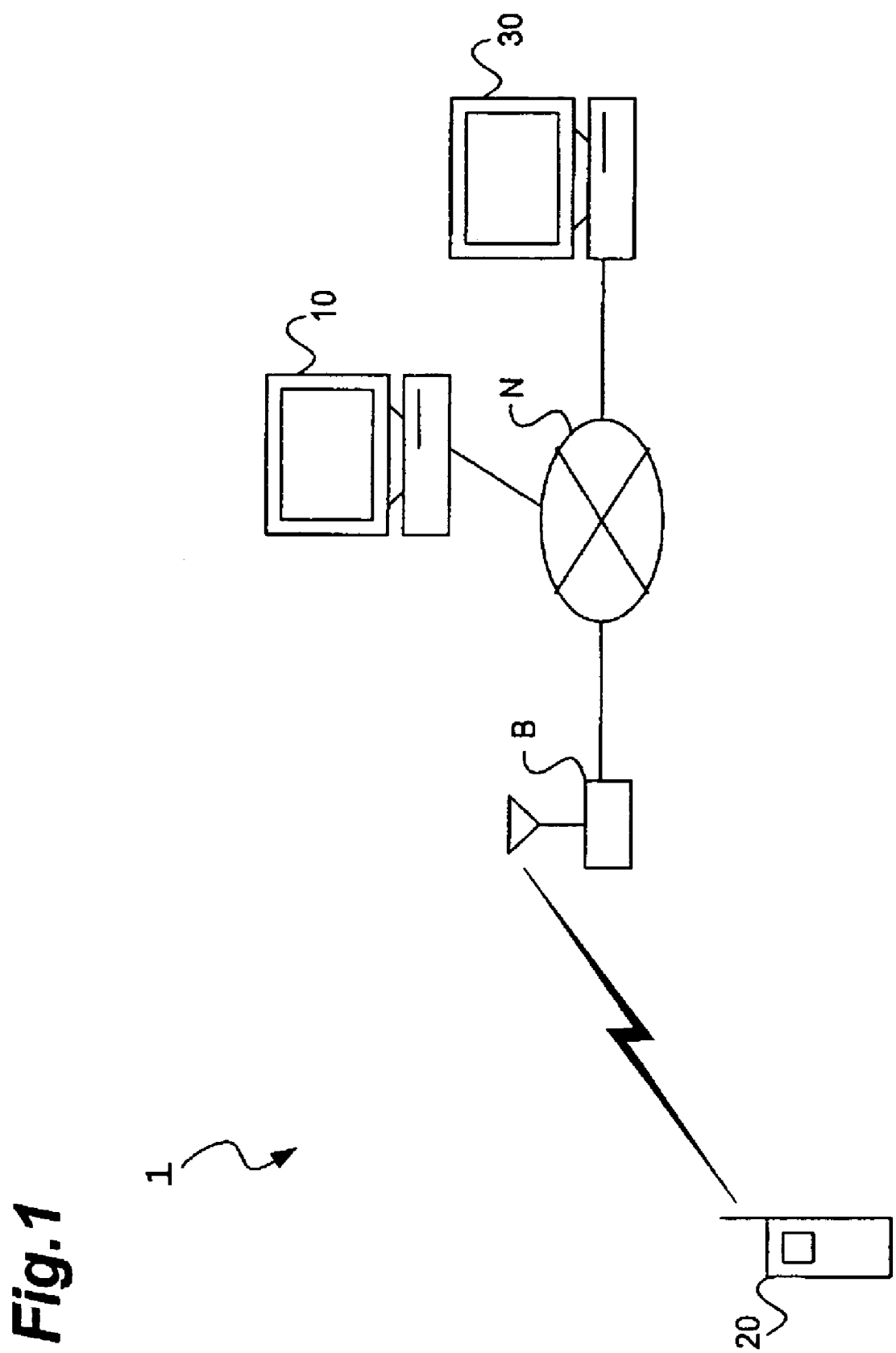
FIG. 1 is a schematic diagram showing the hardware configuration of the electronic book distributing system.

The electronic book distributing system according to the present invention will be described below with reference to the accompanying drawings. First, the configuration will be described. FIG. 1 is a schematic diagram showing an example of the overall configuration of the electronic book distributing system 1 in the present embodiment. As shown in FIG. 1, the electronic book distributing system 1 is mainly comprised of an electronic book coupon circulating server 10 (corresponding to the circulating server), a portable terminal 20 (corresponding to the portable terminal), and an electronic book providing server 30 (corresponding to the providing server).

The portable terminal 20 is connected via a base station B and a network N to the electronic book coupon circulating server 10, and the portable terminal 20 and the electronic book coupon circulating server 10 are able to transmit and receive data to and from each other. Likewise, the portable terminal 20 is connected via the base station B and the network N to the electronic book providing server 30, and the portable terminal 20 and the electronic book providing server 30 are able to transmit and receive data to and from each other.

Figure 2:
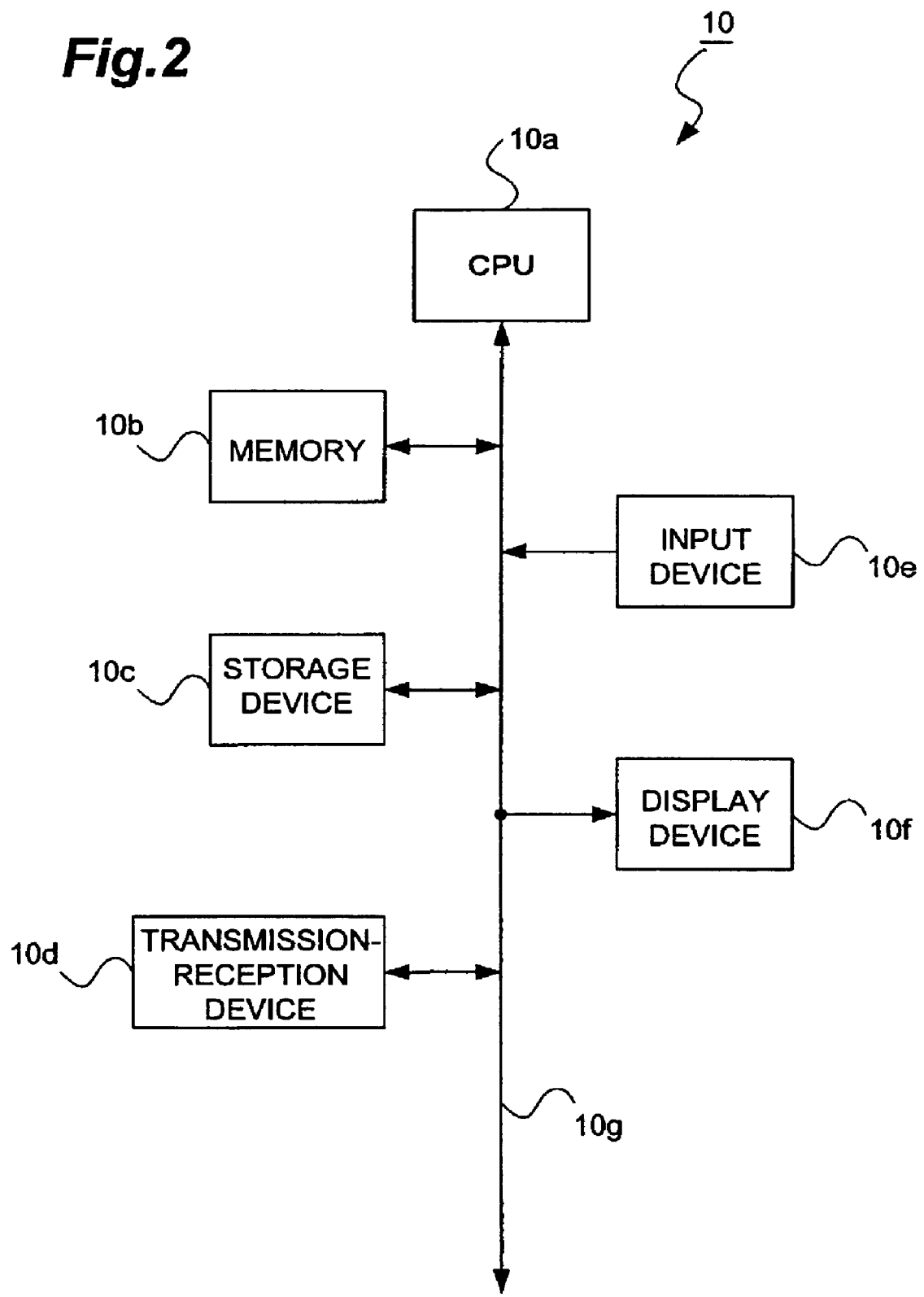
FIG. 2 is a schematic diagram showing the hardware configuration of the electronic book coupon circulating server.

The hardware configurations of the respective terminal devices constituting the electronic book distributing system 1 will be described below. FIG. 2 is a hardware configuration diagram of the electronic book coupon circulating server 10. The electronic book coupon circulating server 10 is comprised of a CPU 10a, a memory 10b such as a RAM (Random Access Memory), a storage device 10c such as a hard disk, a transmission-reception device 10d such as a communication card configured to implement transmission and reception of data to and from the portable terminal 20, an input device 10e such as a keyboard, a mouse, etc., and a display device 10f such as a display unit. The CPU 10a, memory 10b, storage device 10c, transmission-reception device 10d, input device 10e, and display device 10f are electrically connected so as to be able to send and receive various signals through a bus 10g.

Figure 3:
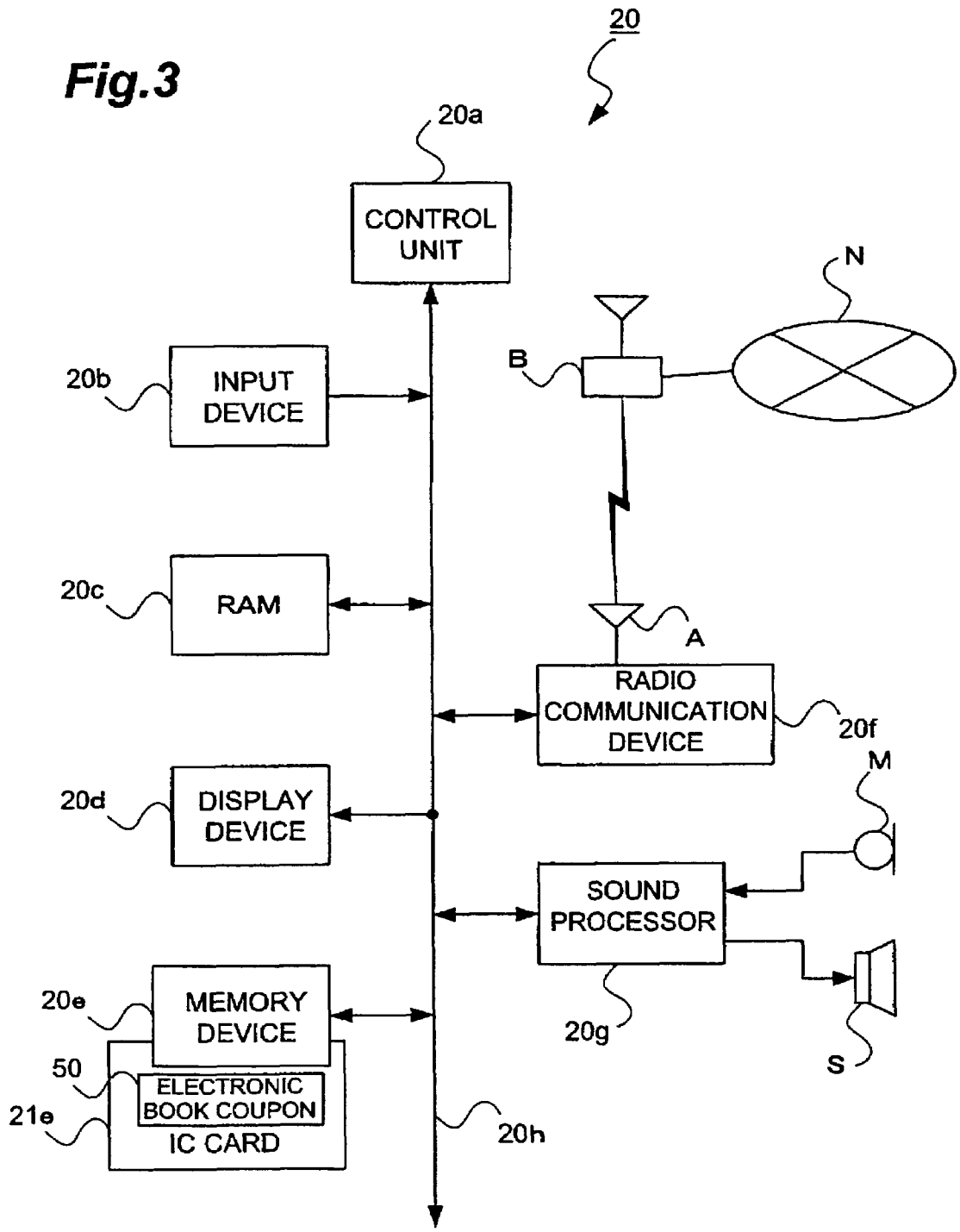
FIG. 3 is a schematic diagram showing the hardware configuration of the portable terminal.

The hardware configuration of the portable terminal 20 will be described below with reference to FIG. 3. FIG. 3 is a hardware configuration diagram of portable terminal 20. The portable terminal 20 is comprised of a control unit 20a, an input device 20b, a RAM 20c, a display device 20d, a memory device 20e, a radio communication device 20f, and a sound processing device 20g. These devices are electrically connected each through a bus 20h so as to be able to transmit and receive various signals to and from each other.

Since the portable terminal 20 is a terminal forming the principal part of the electronic book distributing system according to the present invention, hardware configurations of the respective devices will be described below in more detail. The control unit 20a retrieves a program stored in the memory device 20e, into the RAM 20c and performs concentrated control over each of the parts according to the program. Namely, the control unit 20a executes a variety of processes including an electronic worth reduction process from an electronic book coupon, a decryption process of book data, etc. in accordance with an input signal from the input device 20b and the program retrieved into the RAM 20c and temporarily saves the processing result in the RAM 20c. Then the control unit stores the processing result saved in the RAM 20c, into a predetermined area inside the memory device 20e according to need.

The input device 20b is provided with various operation buttons to order ON/OFF of power, selection of functions, etc., and these various operation buttons are depressed alone or in combination to output an input signal according to a command to the control unit 20a.

The RAM (Random Access Memory) 20c is comprised of a volatile semiconductor memory and is configured to temporarily save the program or data retrieved from the storage device 20e described hereinafter, during the various processes executed by the control unit 20a. The RAM 20c also has the function of VRAM (Video RAM) for temporarily saving data to be displayed on the display device 20d.

The display device 20d is comprised of an LCD (Liquid Crystal Display), an EL (Electro Luminescence) device, or the like, and is configured to display display-data on a screen according to a display signal supplied from the control unit 20a.

The memory device 20e is comprised of a nonvolatile semiconductor memory such as an EEPROM (Electrically Erasable and Programmable ROM) or the like, and is configured to store data necessary for execution of the various processes, data generated as a result of execution of the various processes, and so on. The memory device 20e is equipped with an IC (Integrated Circuit) card 21e in a detachable state. The IC card 21e can store the electronic book coupon described hereinafter.

The radio communication device 20f controls radio communication with the base station B. Specifically, the radio communication device 20f is a circuit having a modem (not shown) for modulating and demodulating signals, and a codec (not shown) for coding and decoding signals, and is equipped with an antenna A. The antenna A is retractably mounted in the upper part of a housing of the portable terminal 20 and is adapted to transmit and receive radio waves to and from the base station B.

The sound processing device 20g is comprised of a converter, an amplifier, etc. and is equipped with a microphone M and a speaker S. The sound processing device 20g is configured to convert audio data from the control unit 20a into analog signals by the converter (not shown) and emit sound from the speaker S through the amplifier (not shown), during calls. The sound processing device 20g is also configured to convert audio signals from the microphone M into digital signals by the converter and output the digital signals to the control unit 20a, during calls.

The hardware configuration of the electronic book providing server 30, which is also a component of the electronic book distributing system 1, is much the same as that of the electronic book coupon circulating server 10. Accordingly, the components of the electronic book providing server 30 will be denoted by a like series of reference symbols as those of the components of the electronic book coupon circulating server 10, without the illustration and detailed description thereof. Namely, the electronic book providing server 30 is provided with a CPU 30a, a memory 30b, a storage device 30c, a transmission-reception device 30d, an input device 30e, and a display device 30f, and these devices each are electrically connected so as to be able to send and receive various signals through a bus 30g.

Figure 4:
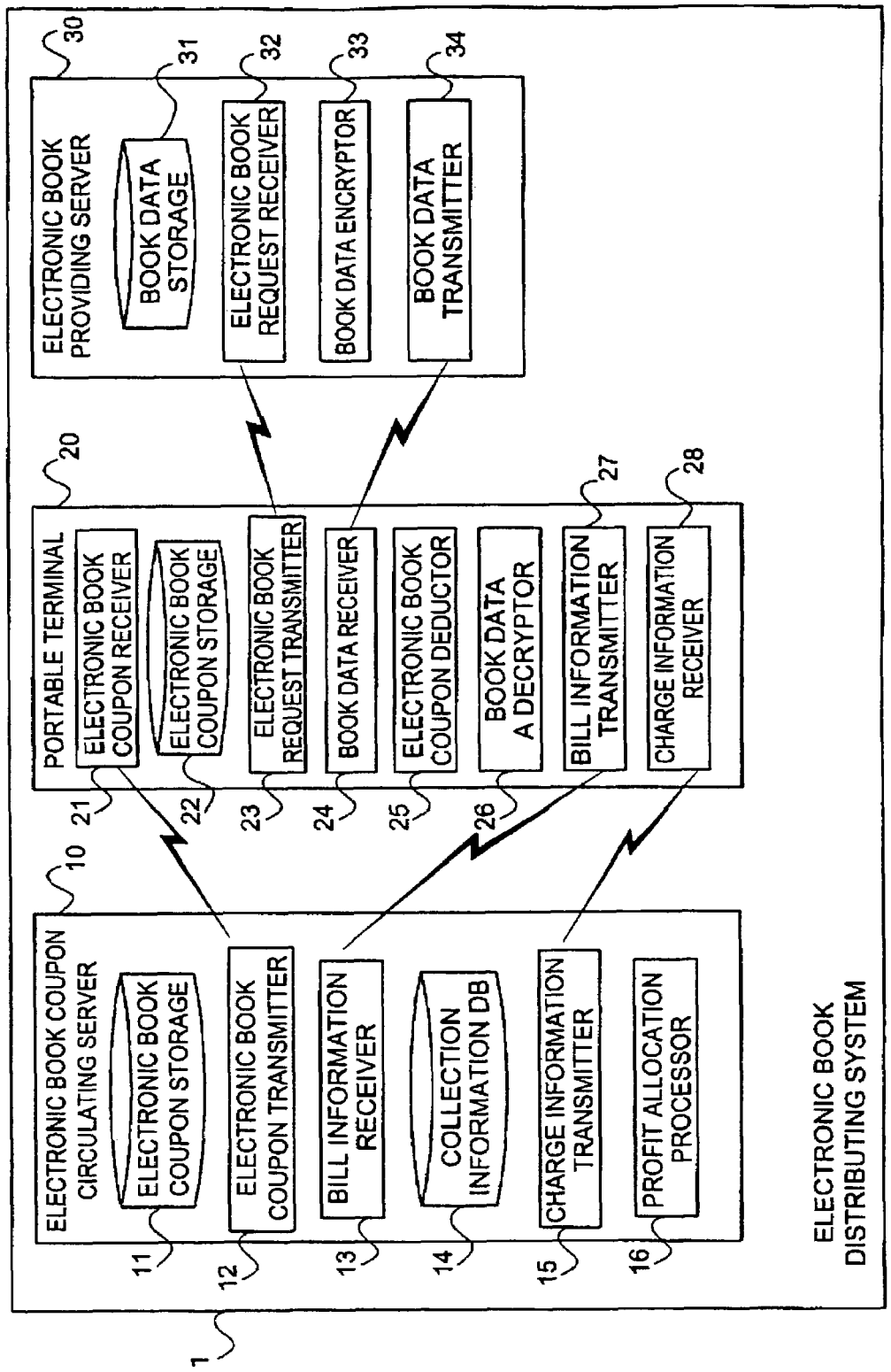
FIG. 4 is a conceptual diagram showing the functional configuration of the electronic book distributing system.

FIG. 4 is a system configuration diagram showing the functional configuration of the electronic book distributing system 1 in the present embodiment. As shown in FIG. 4, the electronic book coupon circulating server 10 has an electronic book coupon storage 11, an electronic book coupon transmitter 12, a bill information receiver 13, a collection information DB (Data Base) 14, a charge information transmitter 15, and a profit allocation processor 16. The electronic book coupon circulating server 10 is a server apparatus managed by an electronic book coupon circulating company selling electronic book coupons in the prepaid system.

In order to clearly discriminate a book from pages being component units of the book, electronic data of the former will be referred to as "book data," and electronic data of the latter as "page data." Namely, the book data consists of a plurality of page data units. The components of the book, which are individually digitized as electronic data, do not always have to be pages, but may also be chapters, paragraphs, and so on.

The electronic book coupon storage 11 stores electronic book coupons as electronic values. The electronic book coupon storage 11 is preferably comprised of an IC-card-equivalent tamper-resistant device in view of the confidentiality, reliability, etc. of data in the electronic book coupons. The electronic book coupons are used for acquisition of book data containing a plurality of page data units as a plurality of component data units. An electronic book coupon includes a decryption key for decryption of a plurality of encrypted page data, and remainder information indicating the remainder of electronic worth. In a preferred embodiment, the electronic book coupon is provided with a digital signature for clearly indicating the place of origin thereof.

The electronic book coupon transmitter 12 transmits an electronic book coupon read out of the electronic book coupon storage 11, to the portable terminal 20 in accordance with a request from the portable terminal 20.

The bill information receiver 13 receives the bill information transmitted from a bill information transmitter 27 of the portable terminal 20. The bill information contains at least information for specifying page data and a bill for decryption of the page data. The bill information received by the bill information receiver 13 will be described below in detail with reference to FIG. 5. FIG. 5 is a diagram showing a configuration example of the bill information 131 transmitted from the portable terminal 20. As shown in FIG. 5, the bill information 131 contains an electronic book ID storage area 131a, an already-read page storage area 131b, and a bill storage area 131c.

The electronic book ID storage area 131a stores identification information (e.g., "00001," "00002," "00004") of electronic books which the portable terminal 20 acquired from the electronic book providing server 30, as "electronic book IDs." The electronic book IDs can be, for example, ISBNs (International Standard Book Numbers) by which countries, publishers, titles, etc. can be specified.

The already-read page storage area 131b stores identification information (e.g., page numbers of "1, 2, 3, 4, 5," "1, 2, 3," "1, 2, 3, 4," etc.) of page data units which the portable terminal 20 decrypted by use of the electronic book coupon, as "already-read pages."

The bill storage area 131c stores bill data (e.g., "7.5," "3.5," "6.0," in the unit of yen) for page data decrypted by use of the electronic book coupon by the portable terminal 20, as "bill." This bill is an amount to be deducted from the electronic book coupon prior to decryption of page data, which is obtained by multiplying a unit page price of a corresponding electronic book by the number of already-read pages. For example, supposing that the unit page price of the electronic book corresponding to the electronic book ID "00001" is ¥1.5/page and that the already read pages are five pages of "1, 2, 3, 4, 5," we can calculate as 1.5×5=7.5, and the bill calculated for the electronic book is "7.5 yen." As in this example, the minimum price unit of the bill may be less than one yen.

The collection information DB 14 (corresponding to the collection information storing means) stores "collection information" containing the bill information received by the bill information receiver 13, in correspondence to bill dates and collected bill payments. Here the bill information is independent information per portable terminal user (i.e., per electronic book purchaser), whereas the collection information is independent information per electronic book.

FIG. 6 is a diagram showing a configuration example of collection information about three portable terminals including the portable terminal 20. The collection information corresponding to the portable terminal 20 will be described as a typical example below with reference to FIG. 6. As shown in FIG. 6, the bill information 141 contains an electronic book ID storage area 141a, a bill date storage area 141b, an already-read page storage area 141c, a bill storage area 141d, and a collected bill payment storage area 141e.

The electronic book ID storage area 141a stores an electronic book ID extracted from the electronic book ID storage area 131a of the bill information 131 described above. The already-read page storage area 141c stores already-read pages extracted from the already-read page storage area 131b of the bill information 131. Furthermore, the bill storage area 141d stores bills extracted from the bill storage area 131c of the bill information 131.

The bill date storage area 141b stores information indicating dates (e.g., "02.02.27," "02.02.28," "02.03.04") of billing for the corresponding electronic book, i.e., dates in which the book data was decrypted, as "bill dates."

The collected bill payment storage area 141e stores the total amount data (e.g., "18.0,". . . , in the unit of yen) of bills for the corresponding electronic book, as "collected bill payment." This collected bill payment is a total of prices deducted from the electronic book coupons prior to the decryption of corresponding page data, and is equivalent to a sales amount of the electronic book. The collected bill payment is obtained by summing up all the bills stored in the bill storage area 141d. In the present embodiment, the bills for the electronic book ID "00001" are "7.5 yen, 4.5 yen, 6.0 yen," and thus the collected bill payment for the electronic book is calculated as "18.0 yen."

The charge information transmitter 15 transmits charge information to the portable terminal 20 in accordance with a request from the portable terminal 20. The charge information is information containing a record of an electronic worth for replenishing the electronic book coupon, for example, when the remainder of the electronic book coupon becomes small.

The profit allocation processor 16 executes a process of allocating the collected bill payment for each book data at a predetermined ratio on the basis of the collection information stored in the collection information DB 14. Allocations are determined by multiplying the collected bill payment by a predetermined allocation ratio with reference to a table in which receivers of allocations and allocation ratios are stored in correspondence to each other.

As shown in FIG. 4, the portable terminal 20 has an electronic book coupon receiver 21, an electronic book coupon storage 22, an electronic book request transmitter 23, a book data receiver 24, an electronic book coupon deductor 25, a book data decryptor 26, a bill information transmitter 27, and a charge information receiver 28.

The electronic book coupon receiver 21 receives an electronic book coupon transmitted from the electronic book coupon transmitter 12 of the electronic book coupon circulating server 10.

The electronic book coupon storage 22 stores the electronic book coupon received by the electronic book coupon receiver 21, into a predetermined area. This electronic book coupon contains a decryption key for decryption of book data and remainder information indicating the remainder of electronic worth. The electronic book coupon storage 22 is preferably comprised of an IC card or an IC-card-equivalent tamper-resistant device in order to circulate electronic book coupons only between tamper-resistant devices equivalent to or higher than the IC cards in view of the confidentiality, reliability, etc. of data.

The electronic book request transmitter 23 transmits a request for transmission of an electronic book to the electronic book providing server 30.

The book data receiver 24 receives book data transmitted from the electronic book providing server 30. The book data contains the aforementioned electronic book ID.

The electronic book coupon deductor 25 deducts an electronic worth equivalent to a price according to page data requested to be read out, from the electronic book coupon in accordance with a readout request for readout of the page data in the book data received by the book data receiver 24.

The book data decryptor 26 decrypts the page data in conjunction with the deduction of the electronic worth equivalent to the price according to the page data requested to be read out, from the electronic book coupon by the electronic book coupon deductor 25. The decryption is carried out by use of the decryption key in the electronic book coupon received by the electronic book coupon receiver 21.

The bill information transmitter 27 generates the bill information corresponding to the decrypted page data in conjunction with transmission of a charge request to the electronic book coupon circulating server 10, and transmits it to the electronic book coupon circulating server 10. The charge request is transmitted for charging the electronic book coupon with a shortfall of electronic worth, but it is not always transmitted when the remainder of electronic worth becomes 0; the transmission timing can be arbitrary.

The charge information receiver 28 receives the aforementioned charge information from the electronic book coupon circulating server 10.

As shown in FIG. 4, the electronic book providing server 30 has a book data storage 31, an electronic book request receiver 32, a book data encryptor 33, and a book data transmitter 34. The electronic book providing server 30 is a server apparatus managed by a publisher publishing electronic books, a distribution agent providing electronic books, or the like.

The book data storage 31 stores book data as objects for provision as electronic books. In a preferred embodiment, the book data is provided with a digital signature in order to clearly demonstrate the place of origin thereof.

The electronic book request receiver 32 receives an electronic book transmission request transmitted from the electronic book request transmitter 23 of the portable terminal 20.

The book data encryptor 33 encrypts a plurality of page data units in the book data requested to be transmitted, on a unit-by-unit basis in conjunction with the reception of the electronic book transmission request by the electronic book request receiver 32. The encryption is performed by use of an encryption key.

In another potential configuration, the book data as objects of provision is preliminarily encrypted in page data units and the encrypted data is stored in the book data storage 31. In this configuration, the book data encryptor 33 is not always an essential component in the providing server according to the present invention.

The book data transmitter 34 transmits the book data requested to be transmitted, to the portable terminal 20. The book data does not always have to be transmitted in the full volume of book data at a time, but may also be arranged to be transmitted as data divided on a page or chapter basis in accordance with a request from the user of the portable terminal 20. The portable terminal 20 has the smaller capacity of available radio resources and the smaller volume of data processable or recordable at a time than the terminal equipment such as the personal computers or the like. For this reason, the bulk download of large-volume data like book data of full volume is not practical in terms of the communication load on the mobile communication networks and the processing power of the portable terminal. Therefore, the moderate segmentation of received book data can implement reduction of the communication load and reception of data in the volume suitable for the processing power.

The operation of the electronic book distributing system 1 in the present embodiment will be described below, together with the electronic book distributing method according to the present invention. Each of the steps described below is implemented when the programs stored in the storage device 10c shown in FIG. 2, in the memory device 20e shown in FIG. 3, and in the storage device 30c are executed by the CPU 10a, control unit 20a, and CPU 30a.

Figure 7:
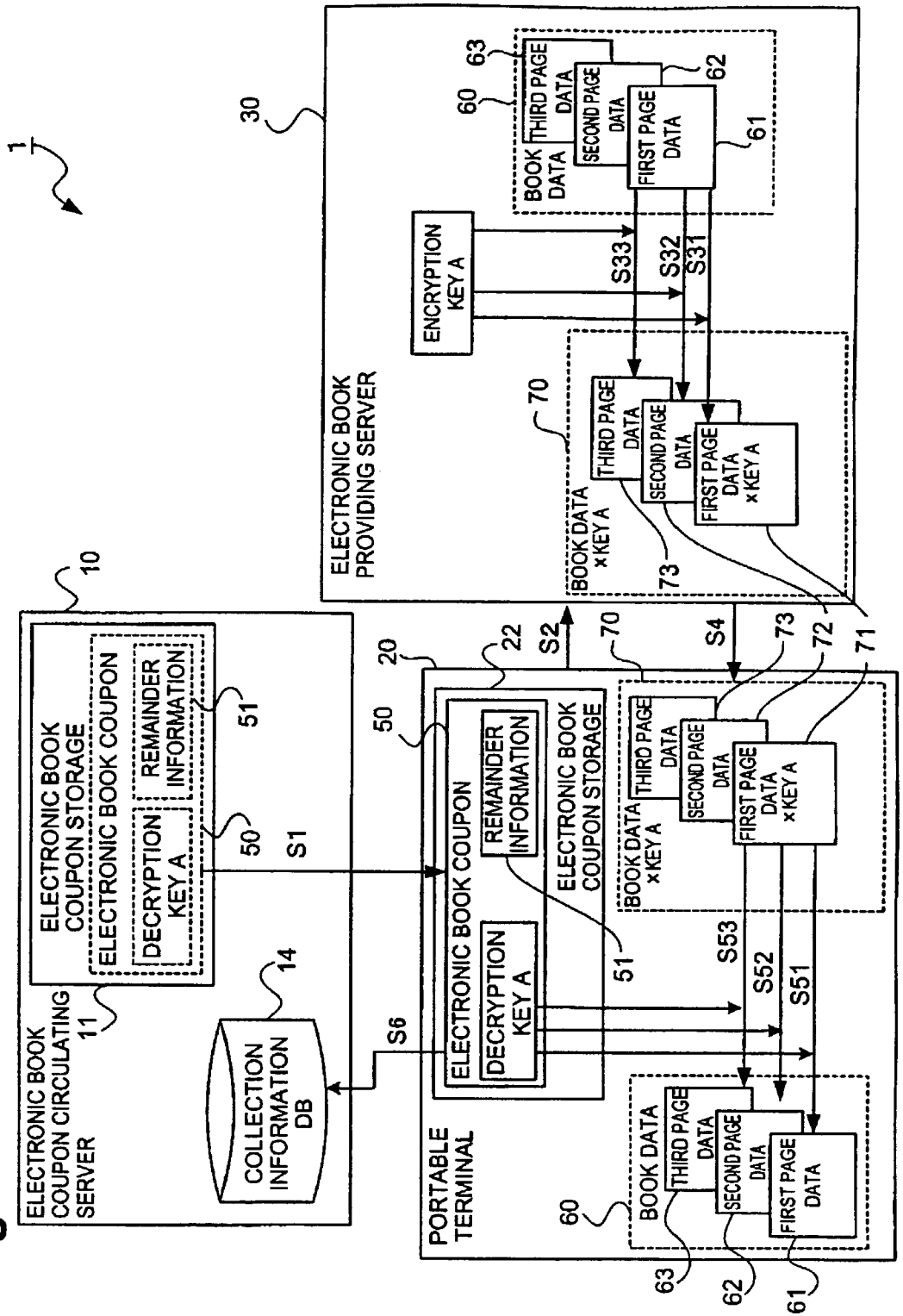
FIG. 7 is a conceptual diagram showing the flow of processing executed by the electronic book distributing system in the first embodiment.

FIG. 7 is a conceptual diagram showing the flow of information processing executed by the electronic book distributing system 1. When the electronic book coupon circulating server 10 first receives a transmission request for transmission of an electronic book coupon 50 from the portable terminal 20, it retrieves the electronic book coupon 50 requested to be transmitted, from the electronic book coupon storage 11. The electronic book coupon transmitter 12 transmits the electronic book coupon 50 thus retrieved, to the portable terminal 20. The electronic book coupon receiver 21 of the portable terminal 20 receives the electronic book coupon 50 transmitted (S1). The received electronic book coupon 50 is stored into the electronic book coupon storage 22.

The electronic book coupon 50 transmitted and received in S1 contains a decryption key A for decryption of the encrypted electronic book. The electronic book coupon 50 is received between the electronic book coupon storage 11 and the electronic book coupon storage 22 in conformity to a protocol preliminarily defined between the electronic book coupon circulating server 10 and the portable terminal 20, and is always present only in these storages. Since these storages both are the tamper-resistant devices, as described above, it is feasible to prevent the injustices including the leakage, falsification, etc. of the data in the electronic book coupon by a third person. As a result, it is feasible to ensure high confidentiality and reliability of the electronic book coupon 50.

When the portable terminal 20 acquires the electronic book coupon 50, the user of the portable terminal 20 becomes able to purchase an electronic book. When the user purchases an electronic book, the electronic book request transmitter 23 of the portable terminal 20 transmits an electronic book request to the electronic book providing server 30. The electronic book request thus transmitted is received by the electronic book request receiver 32 of the electronic book providing server 30 (S2).

When the electronic book request is received, the book data corresponding to the requested electronic book is read out of the book data storage 31. The book data 60 thus read out is encrypted by use of an encryption key A by the book data encryptor 33. The encryption process of the book data 60 is carried out in steps of one page data unit (S31-S33)

For convenience' sake of description, let us suppose in the present embodiment that the book consists of three pages. Therefore, the book data 60 consists of first page data 61, second page data 62, and third page data 63. Although the encryption key A used in the encryption is illustrated as a single encryption key in FIG. 7, it is also possible to use different encryption keys for the respective page data units.

The encryption process in S31-S33 results in encrypting the book data 60 by the encryption key A and generating "book data 60×key A." Here "X×Y" indicates that "X" is data encrypted by use of "Y." For example, "data×key A" indicates that data is data encrypted by use of the encryption key A. The book data 60×key A indicates that the first to third page data is data encrypted by use of the encryption key A. Accordingly, book data×key A 70 is data consisting of first page data×key A 71, second page data×key A 72, and third page data×key A 73.

The book data×key A 70 is transmitted to the portable terminal 20 by the book data transmitter 34. The book data× key A 70 thus transmitted is received by the book data receiver 24 of the portable terminal 20 (S4). When a readout request for readout of at least one page data unit is made for the received book data×key A 70, an electronic worth equivalent to a price according to the page data requested to be read out is deducted from the electronic book coupon 50 by the electronic book coupon deductor 25.

After the electronic worth deduction process is completed for the book data×key A 70, the book data decryptor 26 decrypts the book data×key A 70 by use of the decryption key A in the electronic book coupon 50. The decryption process of the book data×key A 70 is carried out in steps of one page data unit, as in the case of the encryption process (S51-S53).

The decryption process is desirably executed inside the IC card as the electronic book coupon storage 22. Since the IC card is the tamper-resistant device, the page data is decrypted inside the tamper-resistant device by use of the decryption key stored in the tamper-resistant device. Accordingly, higher security can be ensured than in the case where it is decrypted inside application software such as dedicated browser software or inside hardware equipped with an IC card reader.

Then the page data decrypted by the book data decryptor 26 is displayed in a predetermined display area of the display device 20d shown in FIG. 3, to be read by the user of the portable terminal 20.

The decryption process of the book data×key A 70 is executed in conjunction with completion of the electronic worth deduction process. In other words, the book data×key A 70 will never be decrypted unless the electronic worth deduction process is completed. Accordingly, if the remainder of the electronic worth in the electronic book coupon 50 is less than the price of the book data as an object of decryption, the book data will not be decrypted and the portable terminal 20 cannot display the book data. This imposes restrictions on the purchase and reading of the electronic book by the user of the portable terminal 20.

Then the user of the portable terminal 20 needs to charge the electronic book coupon with additional electronic worth in order to continue the purchase and reading of the desired book data. The charging with electronic worth is started when the portable terminal 20 transmits a charge request to the electronic book coupon circulating server 10; specifically, the bill information transmitter 27 transmits the bill information about the decrypted page data along with this charge request to the electronic book coupon circulating server 10 (S6). The bill information thus transmitted is received by the bill information receiver 13 to be used for generation of the collection information as described above.

Accordingly, when the user of the portable terminal 20 replenishes the electronic book coupon with an electronic worth of shortfall, the collection information DB automatically comes to reflect the information about the electronic book purchased and read by the user. This makes it feasible to securely and collectively allocate the profit according to the electronic worth used between acquisition and charging of the electronic book coupon.

In the electronic book distributing system 1 according to the present invention, as described above, the deduction process or billing in steps of one page data unit is effected on the portable terminal 20 at the time of the decryption of the book data 60. For this reason, the electronic book providing server 30 can provide the electronic book on a page-by-page basis. Accordingly, the user of the portable terminal 20 can purchase and read only desired pages in a desired book. The user is not billed for pages that the user does not desire to purchase and read in the acquired book, so that the user can reduce the waste of the electronic book coupon. As a result, the convenience can be enhanced in use of the electronic book.

Furthermore, the book data is encrypted page data in steps of one page data unit, and an electronic worth equivalent to a price according to decrypted page data is deducted from the electronic book coupon, prior to decryption of each page data unit. For this reason, billing takes place inevitably with decryption and display of page data, whereby it is feasible to prevent unauthorized copy and unreasonable billing of page data.

The administrator of the electronic book coupon circulating server 10 can readily specify allocation receivers of profit with circulation of electronic book coupons and electronic books by referring to the electronic book IDs stored in the collection information DB 14. The administrator of the electronic book coupon circulating server 10 can also readily and quickly calculate allocations to respective allocation receivers out of the profit by referring to the collection information stored in the collection information DB 14.

For example, in the case where the allocation receivers of the above profit are three parties including the administrator of the electronic book coupon circulating server 10, the publisher of the electronic book, and the author of the electronic book and where the allocation ratio to these allocation receivers is 30%, 50%, and 20%, respectively, the collected bill payment corresponding to the electronic book is allocated at the ratio of 3:5:2 to the respective allocation receivers. If the administrator of the electronic book providing server 30 is different from the publisher of the electronic book, the profit is also allocated to the administrator of the electronic book providing server 30.

Second Embodiment

The second embodiment of the present invention will be described below with reference to the accompanying drawings. Since the basic configuration of the electronic book distributing system in the present embodiment is much the same as the configuration of the electronic book distributing system 1 in the first embodiment, the components will be denoted by the same reference symbols without description thereof and the differences from the first embodiment will be detailed below. The electronic book distributing system 2 in the present embodiment is different from the electronic book distributing system 1 in the first embodiment in that a key for decryption of book data is further encrypted and the key is decrypted by use of a decryption key.

The operation of the electronic book distributing system 2 in the present embodiment will be described below with reference to FIG. 8, together with the electronic book distributing method according to the present invention. Each of the steps described below is implemented when the programs stored in the storage device 10c (cf. FIG. 2), the memory device 20e (cf. FIG. 3), and the storage device 30c are executed by the CPU 10a, the control unit 20a, and the CPU 30a.

Figure 8:
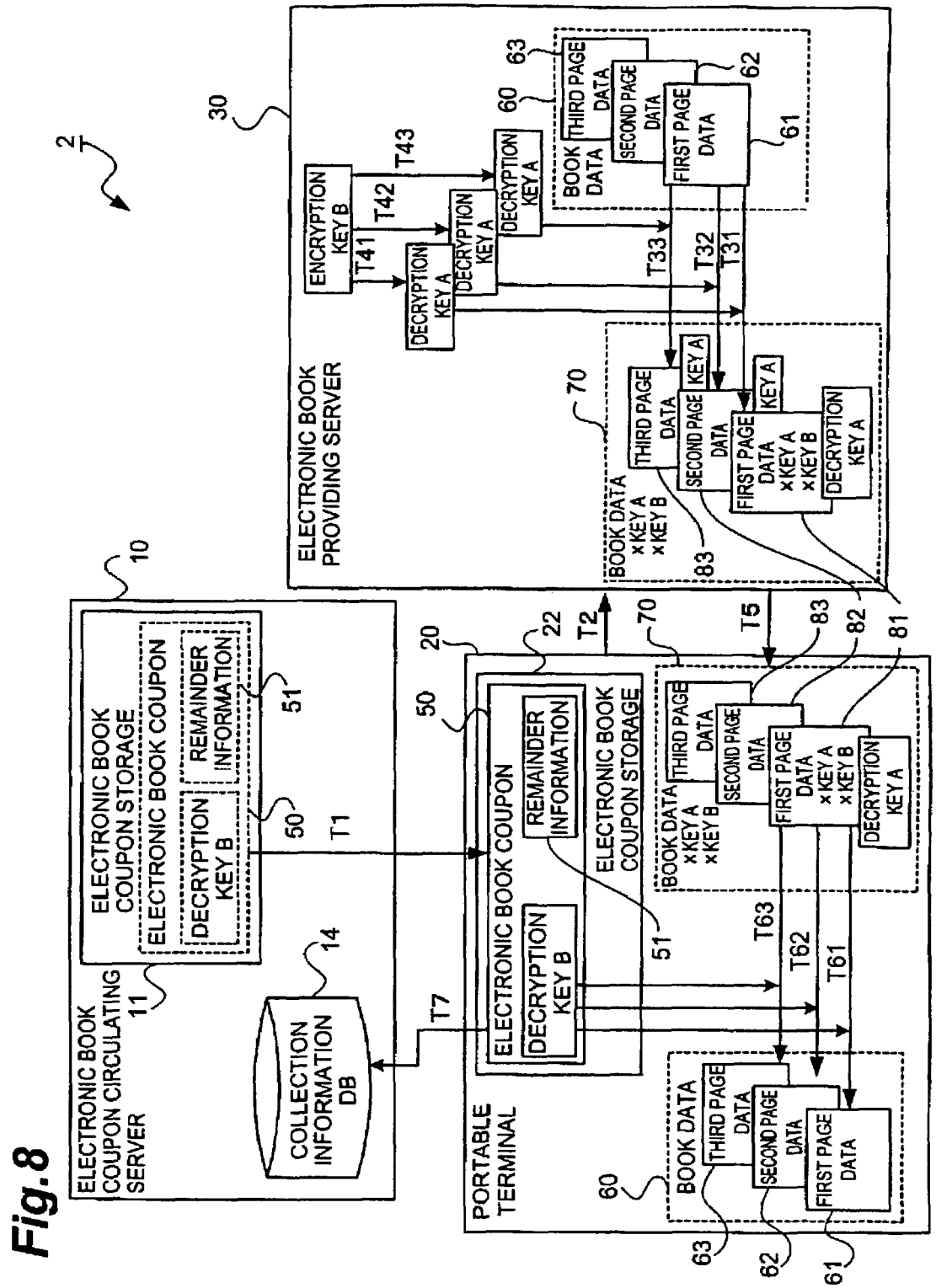
FIG. 8 is a conceptual diagram showing the flow of processing executed by the electronic book distributing system in the second embodiment.

FIG. 8 is a conceptual diagram showing the flow of information processing executed by the electronic book distributing system 2. The operation of the electronic book distributing system 2 in the present embodiment is much the same in major part as the operation of the electronic book distributing system 1 detailed in the first embodiment. Namely, T1, T2, and T7 shown in FIG. 8 correspond to S1, S2, and S6 shown in FIG. 7. The following is the description of T31-T33, T41-T43, T5, and T61-T63 in which processes different from those in the second embodiment are executed.

Namely, T31-T33 are to encrypt the book data 60 in the respective page data units 61, 62, and 63. T41-T43 are to encrypt a plurality of decryption keys A for decryption of the encrypted book data 60 by an encryption key B. As a result, these processes yield book data×key A×key B 80.

In T5, the book data×key A×key B 80 is transmitted along with the plurality of decryption keys A from the electronic book providing server 30 to the portable terminal 20. The book data×key A×key B 80 consists of page data×key A×key B 81-83, and the plurality of decryption keys A are transmitted while being attached to the respective data units.

In T61-T63, the portable terminal 20 decrypts the book data×key A×key B 80 in order to acquire the book data. This decryption process is carried out stepwise. Namely, the encryption key B is first decrypted by use of the decryption key B held by the electronic book coupon 50, to generate the decryption key A and the book data×key A. Subsequently, the book data×key A is decrypted by use of the decryption key A thus generated, to generate the book data.

As described above, the plurality of page data units constituting the book data each are encrypted. Furthermore, the plurality of decryption keys A for decryption of the plurality of encrypted page data units each are encrypted by the encryption key B. The electronic book coupon 50 has the decryption key B for decryption of the plurality of encrypted decryption keys A. This results in effecting double encryption of the page data transmitted and received between terminals, whereby the security level can be raised as compared with the system in the first embodiment.

It is noted that the forms described in the respective embodiments are just preferred examples of the electronic book distributing system according to the present invention and that the present invention is by no means intended to be limited to these forms. For example, either of the above embodiments may be arranged so that the encryption key and the decryption key are identical with each other (in the private-key cryptographic scheme) or different from each other (in the public-key cryptographic scheme). However, in order to ensure higher security about book data, it is desirable to adopt the public-key cryptographic scheme with easier management of keys and higher security than the private (common)-key cryptographic scheme.

The bill information was arranged to be transmitted along with the charge request, but the transmission timing of the bill information can be arbitrary; it may be transmitted in conjunction with the deduction process of electronic worth. For example, the first embodiment may be modified as follows. With a readout request for readout of first page data×key A 71 and second page data×key A 72 out of the first to third encrypted page data units, an electronic worth equivalent to the two page data units is deducted from the electronic book coupon. In conjunction therewith, the bill information in which the first page data 61 and the second page data 62 of the book data 60 is described as already-read pages, is transmitted to the electronic book coupon circulating server 10. Concerning billing targets in the bill information to be transmitted at this time, the number of page data can be one or more, of course, and the number of book data can also be one or more.

In this configuration, the bill information is transmitted to the electronic book coupon circulating server 10 prior to the decryption of the book data (page data), and thus the bill information corresponding to the decrypted book data is completely reflected in the collection information DB. Namely, no time lag takes place between decryption of book data and update of collection information. Accordingly, the administrator of the electronic book coupon circulating server 10 becomes able to always properly and quickly allocate the profit on the basis of the up-to-date collection information.

Furthermore, the above embodiments both were arranged so that the portable terminal 20 once received the full volume of one electronic book and executed the decryption process and deduction process (billing process) in page units, but all the processes including the reception may be arranged to be carried out in page units. Specifically, the user of the portable terminal 20 designates page units of an electronic book to be transmitted (e.g., P1-P10 of book X) and the electronic book providing server 30 transmits only the designated page data units to the portable terminal 20. This arrangement can avoid transmission and reception of unnecessary page data in the case where the user of the portable terminal 20 can preliminarily determine pages that the user desires to purchase and read. Accordingly, it is feasible to reduce the communication load due to consumption of radio resources and to save the storage area of the book data.

Third Embodiment

The electronic book distributing system according to the present invention will be described below with reference to the accompanying drawings. First, the configuration will be described. FIG. 1 is a schematic diagram showing an example of the overall configuration of the electronic book distributing system 3 in the present embodiment. As shown in FIG. 1, the electronic book distributing system 3 is mainly comprised of an electronic book coupon circulating server 10 (corresponding to the circulating server), a portable terminal 20 (corresponding to the portable terminal), and an electronic book providing server 30 (corresponding to the providing server).

The portable terminal 20 is connected via a base station B and a network N to the electronic book coupon circulating server 10, and the portable terminal 20 and the electronic book coupon circulating server 10 are able to transmit and receive data to and from each other. Likewise, the portable terminal 20 is connected via the base station B and the network N to the electronic book providing server 30, and the portable terminal 20 and the electronic book providing server 30 are able to transmit and receive data to and from each other.

The hardware configurations of the respective terminal devices constituting the electronic book distributing system 3 will be described below. FIG. 2 is a hardware configuration diagram of the electronic book coupon circulating server 10. The electronic book coupon circulating server 10 is comprised of a CPU 10a, a memory 10b such as a RAM (Random Access Memory), a storage device 10c such as a hard disk, a transmission-reception device 10d such as a communication card configured to implement transmission and reception of data to and from the portable terminal 20, an input device 10e such as a keyboard, a mouse, etc., and a display device 10f such as a display unit. The CPU 10a, memory 10b, storage device 10c, transmission-reception device 10d, input device 10e, and display device 10f are electrically connected so as to be able to send and receive various signals through a bus 10g.

The hardware configuration of the portable terminal 20 will be described below with reference to FIG. 3. FIG. 3 is a hardware configuration diagram of portable terminal 20. The portable terminal 20 is comprised of a control unit 20a, an input device 20b, a RAM 20c, a display device 20d, a memory device 20e incorporating an IC card 21e in a detachable state, a radio communication device 20f, and a sound processing device 20g. These devices are electrically connected each through a bus 20h so as to be able to transmit and receive various signals to and from each other.

Since the portable terminal 20 is a terminal forming the principal part of the electronic book distributing system according to the present invention, hardware configurations of the respective devices will be described below in more detail.

The control unit 20a retrieves a program stored in the memory device 20e, into the RAM 20c and performs concentrated control over each of the parts according to the program. Namely, the control unit 20a executes a variety of processes including an electronic worth reduction process from an electronic book coupon, a decryption process of book data, etc. in accordance with an input signal from the input device 20b and the program retrieved into the RAM 20c and temporarily saves the processing result in the RAM 20c. Then the control unit stores the processing result saved in the RAM 20c, into a predetermined area inside the memory device 20e according to need.

The input device 20b is provided with various operation buttons to order ON/OFF of power, selection of functions, etc., and these various operation buttons are depressed alone or in combination to output an input signal according to a command to the control unit 20a.

The RAM (Random Access Memory) 20c is comprised of a volatile semiconductor memory and is configured to temporarily save the program or data retrieved from the memory device 20e described hereinafter, during the various processes executed by the control unit 20a. The RAM 20c also has the function of VRAM (Video RAM) for temporarily saving data to be displayed on the display device 20d.

The display device 20d is comprised of an LCD (Liquid Crystal Display), an EL (Electro Luminescence) device, or the like, and is configured to display display data on a screen according to a display signal supplied from the control unit 20a.

The memory device 20e is comprised of a nonvolatile semiconductor memory such as an EEPROM (Electrically Erasable and Programmable ROM) or the like, and is configured to store data necessary for execution of the various processes, data generated as a result of execution of the various processes, and so on. The memory device 20e is equipped with an IC (Integrated Circuit) card 21e in a detachable state. The IC card 21e can store the electronic book coupon described hereinafter.

The radio communication device 20f controls radio communication with the base station B. Specifically, the radio communication device 20f is a circuit having a modem (not shown) for modulating and demodulating signals, and a codec (not shown) for coding and decoding signals, and is equipped with an antenna A. The antenna A is retractably mounted in the upper part of a housing of the portable terminal 20 and is adapted to transmit and receive radio waves to and from the base station B.

The sound processing device 20g is comprised of a converter, an amplifier, etc. and is equipped with a microphone M and a speaker S. The sound processing device 20g is configured to convert audio data from the control unit 20a into analog signals by the converter (not shown) and emit sound from the speaker S through the amplifier (not shown), during calls. The sound processing device 20g is also configured to convert audio signals from the microphone M into digital signals by the converter and output the digital signals to the control unit 20a, during calls.

The hardware configuration of the electronic book providing server 30, which is also a component of the electronic book distributing system 3, is much the same as that of the electronic book coupon circulating server 10. Accordingly, the components of the electronic book providing server 30 will be denoted by a like series of reference symbols as those of the components of the electronic book coupon circulating server 10, without the illustration and detailed description thereof. Namely, the electronic book providing server 30 is provided with a CPU 30a, a memory 30b, a storage device 30c, a transmission-reception device 30d, an input device 30e, and a display device 30f, and these devices each are electrically connected so as to be able to send and receive various signals through a bus 30g.

Figure 9:
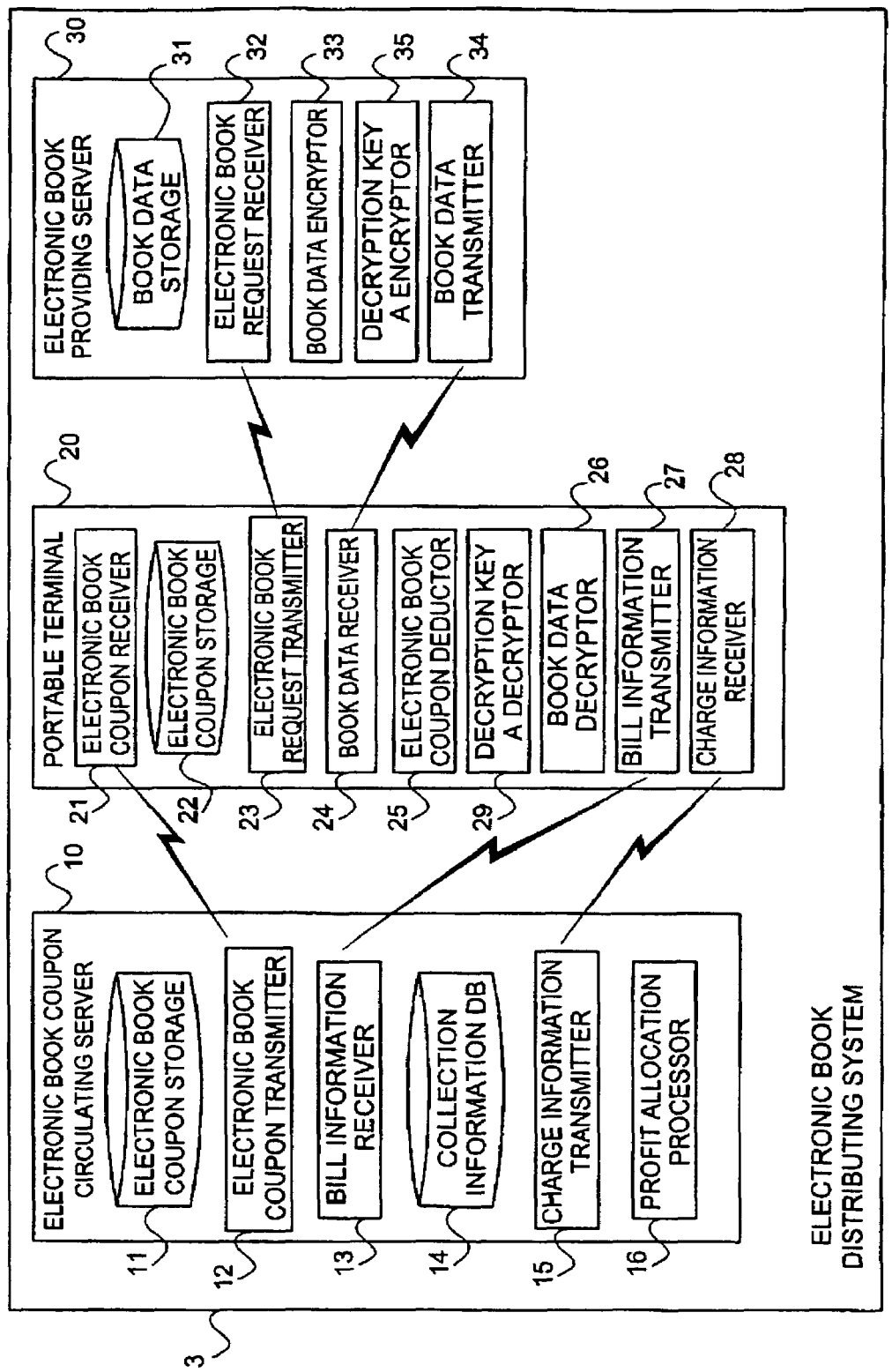
FIG. 9 is a conceptual diagram showing the functional configuration of the electronic book distributing system.

FIG. 9 is a system configuration diagram showing the functional configuration of the electronic book distributing system 3 in the present embodiment. As shown in FIG. 9, the electronic book coupon circulating server 10 has an electronic book coupon storage 11, an electronic book coupon transmitter 12, a bill information receiver 13, a collection information DB (Data Base) 14, a charge information transmitter 15, and a profit allocation processor 16. The electronic book coupon circulating server 10 is a server apparatus managed by an electronic book coupon circulating company selling electronic book coupons in the prepaid system.

In order to clearly discriminate a book from pages being component units of the book, electronic data of the former will be referred to as "book data," and electronic data of the latter as "page data." Namely, the book data consists of a plurality of page data units. The components of the book, which are individually digitized as electronic data, do not always have to be pages, but may also be chapters, paragraphs, and so on.

The electronic book coupon storage 11 stores electronic book coupons as electronic values. The electronic book coupon storage 11 is preferably comprised of an IC-card-equivalent tamper-resistant device in view of the confidentiality and reliability of data in the electronic book coupons. The electronic book coupons are used for acquisition of book data containing a plurality of page data units as a plurality of component data units. An electronic book coupon includes a decryption key for decryption of a plurality of encrypted decryption keys, and remainder information indicating the remainder of electronic worth. In a preferred embodiment, the electronic book coupon is provided with a digital signature issued by a certification organization, in order to ensure the validity thereof and clearly demonstrate the place of origin thereof.

The electronic book coupon transmitter 12 transmits an electronic book coupon read out of the electronic book coupon storage 11, to the portable terminal 20 in accordance with a request from the portable terminal 20.

Figure 10:
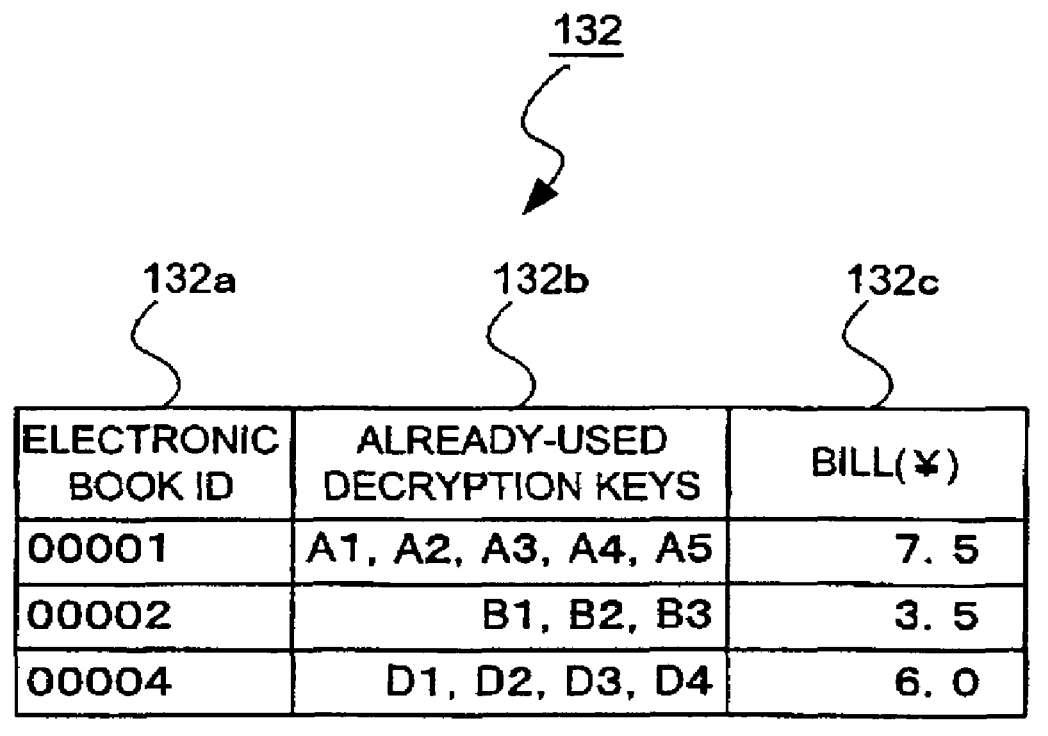

The bill information receiver 13 receives bill information transmitted from a bill information transmitter 27 of the portable terminal 20. The bill information contains at least information for specifying page data and a bill for decryption of decryption keys for decryption of the page data. The bill information received by the bill information receiver 13 will be described below in detail with reference to FIG. 10. FIG. 10 is a diagram showing a configuration example of the bill information 132 transmitted from the portable terminal 20. As shown in FIG. 10, the bill information 132 contains an electronic book ID storage area 132a, an already-used decryption key storage area 132b, and a bill storage area 132c.

The electronic book ID storage area 132a stores identification information (e.g., "00001," "00002," "00004") of electronic books which the portable terminal 20 acquired from the electronic book providing server 30, as "electronic book IDs." The electronic book IDs can be, for example, ISBNs (International Standard Book Numbers) by which countries, publishers, titles, etc. can be specified.

The already-used decryption key storage area 132b stores identification information ("A1, A2, A3, A4, A5," "B1, B2, B3," "D1, D2, D3, D4,") of the decryption keys which the portable terminal 20 decrypted by use of the electronic book coupon, as "already-used decryption keys."

The bill storage area 132c stores bill data (e.g., "7.5," "3.5," "6.0," in the unit of yen) for the decryption keys decrypted by use of the electronic book coupon by the portable terminal 20, as "bill." This bill is an amount to be deducted from the electronic book coupon prior to decryption of the decryption keys, which is obtained by multiplying a unit decryption key price of a corresponding electronic book by the number of already-used decryption keys. For example, supposing that the unit decryption key price of the electronic book corresponding to the electronic book ID "00001" is ¥1.5 and that the already-used decryption keys are five data items of "A1, A2, A3, A4, A5," we can calculate as 1.5×5=7.5, and the bill calculated for the electronic book is "7.5 yen." As in this example, the minimum price unit of the bill may be less than one yen.

The collection information DB 14 stores "collection information" containing the bill information received by the bill information receiver 13, in correspondence to bill dates and a bill. Here the bill information is independent information per portable terminal user (i.e., per electronic book purchaser), whereas the collection information is independent information per electronic book.

FIG. 11 is a diagram showing a configuration example of collection information about three portable terminals including the portable terminal 20. The collection information corresponding to the portable terminal 20 will be described as a typical example below with reference to FIG. 11. As shown in FIG. 11, the bill information 142 contains an electronic book ID storage area 142a, a bill date storage area 142b, an already-used decryption key storage area 142c, a bill storage area 142d, and a collected bill payment storage area 142e.

The electronic book ID storage area 142a stores an electronic book ID extracted from the electronic book ID storage area 132a of the bill information 132 described above. The already-used decryption key storage area 142c stores already-used decryption keys extracted from the already-used decryption key storage area 132b of the bill information 132. Furthermore, the bill storage area 142d stores bills extracted from the bill storage area 132c of the bill information 132.

The bill date storage area 142b stores information indicating dates (e.g., "02.02.27," "02.02.28," "02.03.04") of billing for the corresponding electronic book, i.e., dates in which the decryption keys for decryption of the page data were decrypted, as "bill dates."

The collected bill payment storage area 142e stores the total amount data (e.g., "18.0,". . . , in the unit of yen) of bills for the corresponding electronic book, as "collected bill payment." This collected bill payment is a total of prices deducted from the electronic book coupons prior to the decryption of corresponding decryption keys, and is equivalent to a sale amount of the electronic book. The collected bill payment is determined by summing up all the bills stored in the bill storage area 142d. In the present embodiment, the bills for the electronic book ID "00001" are "7.5 yen, 4.5 yen, 6.0 yen," and thus the collected bill payment for the electronic book is calculated as "18.0 yen."

The charge information transmitter 15 transmits charge information to the portable terminal 20 in accordance with a request from the portable terminal 20. The charge information is information containing a record of an electronic worth for replenishing the electronic book coupon, for example, when the remainder of the electronic book coupon becomes small.

The profit allocation processor 16 executes a process of allocating the collected bill payment for each book data at a predetermined ratio on the basis of the collection information stored in the collection information DB 14. Allocations are determined by multiplying the collected bill payment by a predetermined allocation ratio with reference to a table (not shown) in which receivers of allocations and allocation ratios are stored in correspondence to each other.

As shown in FIG. 9, the portable terminal 20 has an electronic book coupon receiver 21, an electronic book coupon storage 22, an electronic book request transmitter 23, a book data receiver 24, an electronic book coupon deductor 25, a decryption key A decryptor 29, a book data decryptor 26, a bill information transmitter 27, and a charge information receiver 28.

The electronic book coupon receiver 21 receives an electronic book coupon transmitted from the electronic book coupon transmitter 12 of the electronic book coupon circulating server 10.

The electronic book coupon storage 22 stores the electronic book coupon received by the electronic book coupon receiver 21, into a predetermined area. This electronic book coupon contains a decryption key B for decryption of the decryption keys A1, A2, and A3 (which will be hereinafter referred to together as "decryption keys A") for decryption of the book data, and remainder information indicating the remainder of electronic worth. The electronic book coupon storage 22 is preferably comprised of an IC card or an IC-card-equivalent tamper-resistant device in order to circulate electronic book coupons only between tamper-resistant devices equivalent to or higher than the IC cards in view of the confidentiality, reliability, etc. of the data stored inside.

The electronic book request transmitter 23 transmits a request for transmission of an electronic book to the electronic book providing server 30.

The book data receiver 24 receives book data transmitted from the electronic book providing server 30. The book data contains the aforementioned electronic book ID.

The electronic book coupon deductor 25 deducts an electronic worth equivalent to a price according to the decryption keys A for decryption of the page data requested to be read out, from the electronic book coupon in accordance with a readout request for readout of the page data in the book data received by the book data receiver 24.

The decryption key A decryptor 29 decrypts the decryption keys A for decryption of the page data in conjunction with the deduction of the electronic worth equivalent to the price according to the decryption keys A for decryption of the page data requested to be read out, from the electronic book coupon by the electronic book coupon deductor 25. For example, with a readout request for readout of the first page data and third page data, the decryption key A1 and decryption key A3 are decrypted. The decryption process is carried out by use of the decryption key B included in the electronic book coupon received by the electronic book coupon receiver 21.

The book data decryptor 26 decrypts the page data requested to be read out, in conjunction with the decryption of the decryption keys A by the decryption key A decryptor 29. The decryption process is carried out by use of the decryption keys A decrypted by the decryption key A decryptor 29.

The bill information transmitter 27 generates the bill information corresponding to the decrypted decryption keys in conjunction with transmission of a charge request to the electronic book coupon circulating server 10, and then transmits the bill information to the electronic book coupon circulating server 10. The charge request is transmitted for charging the electronic book coupon with an electronic worth of shortfall, but it is not always transmitted when the remainder of electronic worth becomes 0; the transmission timing is arbitrary.

The charge information receiver 28 receives the aforementioned charge information from the electronic book coupon circulating server 10.

As shown in FIG. 9, the electronic book providing server 30 has a book data storage 31, an electronic book request receiver 32, a book data encryptor 33, a decryption key A encryptor 35, and a book data transmitter 34. The electronic book providing server 30 is a server apparatus managed by a publisher publishing electronic books, a distribution agent providing electronic books, or the like.

The book data storage 31 stores book data as objects for provision as electronic books. In a preferred embodiment, the book data is provided with a digital signature issued by a certification organization in order to clearly demonstrate the place of origin thereof.

The electronic book request receiver 32 receives an electronic book transmission request transmitted from the electronic book request transmitter 23 of the portable terminal 20.

The book data encryptor 33 encrypts a plurality of page data units in the book data requested to be transmitted, on a unit-by-unit basis in conjunction with the reception of the electronic book transmission request by the electronic book request receiver 32. The plurality of page data units encrypted herein can be decrypted by a plurality as decryption keys A. The plurality of decryption keys A are keys different from each other and are expressed as decryption keys A1, A2, and A3 herein. The book data as an object of provision may be preliminarily encrypted in page data units and stored in the book data storage 31. In this configuration, the book data encryptor 33 is not always an essential component in the providing server according to the present invention.

The decryption key A encryptor 35 encrypts a plurality of decryption keys A necessary for decryption of the respective page data units one by one in conjunction with the encryption of the plurality of page data units on a unit-by-unit basis by the book data encryptor 33. The encryption is performed by use of an encryption key B. The decryption keys A as objects of transmission may be preliminarily encrypted one by one and stored in correspondence to the page data units in the book data storage 31. In this case, the decryption key A encryptor 35 is not always an essential component in the providing server according to the present invention.

The book data transmitter 34 transmits the book data requested to be transmitted, to the portable terminal 20. The book data does not always have to be transmitted in the full volume of book data at a time, but may also be arranged to be transmitted as data divided on a page or chapter basis in accordance with a request from the user of the portable terminal 20. The portable terminal 20 has the smaller capacity of available radio resources and the smaller volume of data processable or recordable at a time than the terminal equipment such as the personal computers or the like. For this reason, the bulk download of large-volume data like book data of full volume can be presumably impractical in terms of the communication load on the mobile communication networks and the processing power of the portable terminal. Therefore, the moderate segmentation of received book data can implement reduction of the communication load and reception of data in the volume suitable for the processing power.

The operation of the electronic book distributing system 3 in the present embodiment will be described below, together with the electronic book distributing method according to the present invention. Each of the steps described below is implemented when the programs stored in the storage device 10c shown in FIG. 2, in the memory device 20e shown in FIG. 3, and in the storage device 30c are executed by the CPU 10a, control unit 20a, and CPU 30a.

Figure 12:
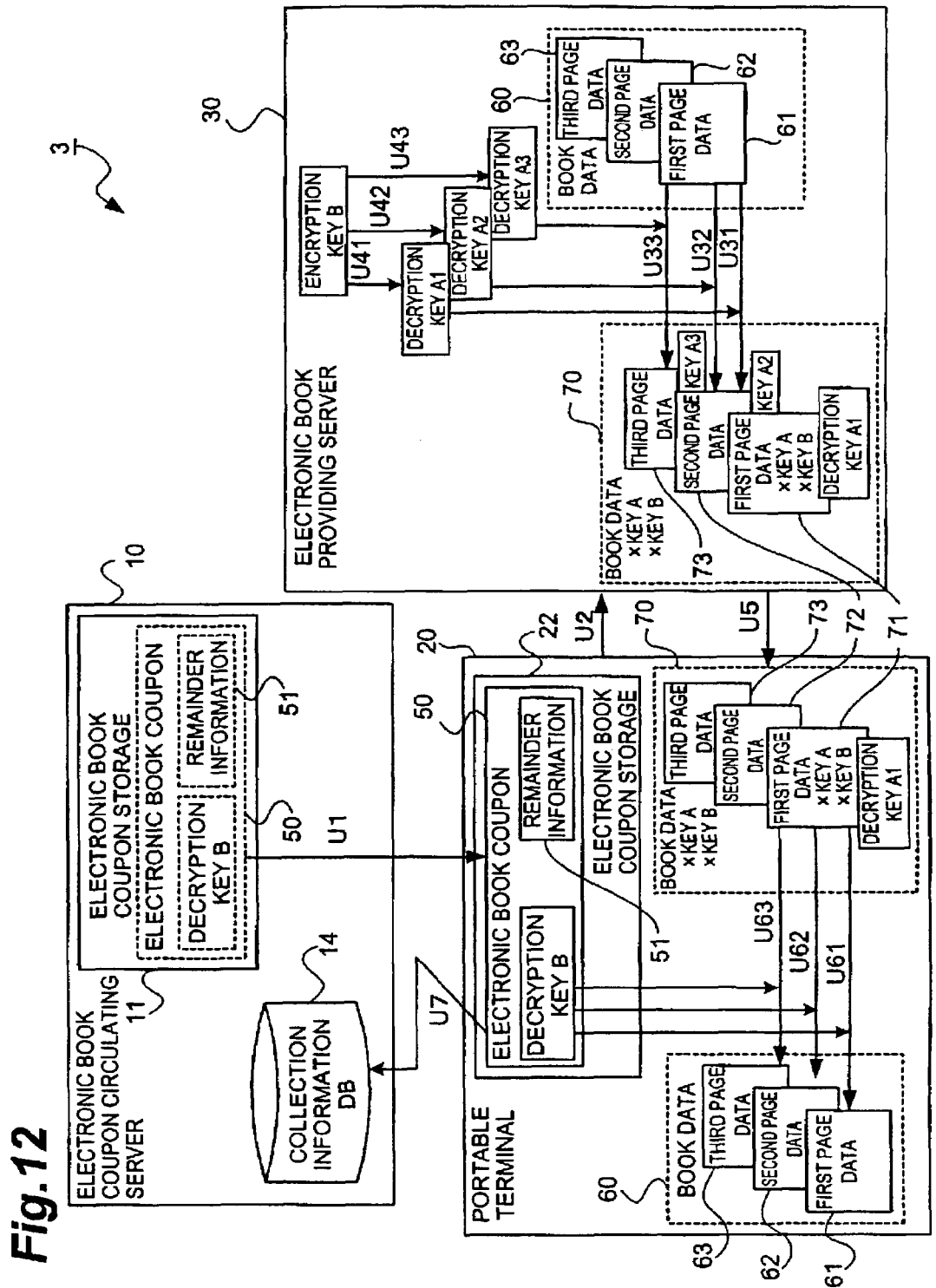
FIG. 12 is a conceptual diagram showing the flow of processing executed by the electronic book distributing system.

FIG. 12 is a conceptual diagram showing the flow of information processing executed by the electronic book distributing system 3. When the electronic book coupon circulating server 10 first receives a transmission request for transmission of an electronic book coupon 50 from the portable terminal 20, it retrieves the electronic book coupon 50 requested to be transmitted, from the electronic book coupon storage 11. The electronic book coupon transmitter 12 transmits the electronic book coupon 50 thus retrieved, to the portable terminal 20. The electronic book coupon receiver 21 of the portable terminal 20 receives the electronic book coupon 50 transmitted (U1). The received electronic book coupon 50 is stored into the electronic book coupon storage 22. A settlement process with the sale of the electronic book coupon is executed by an external settlement-dedicated server not illustrated.

The electronic book coupon 50 transmitted and received in U1 contains the decryption key B for decryption of the decryption keys A for decryption of the encrypted electronic book. The electronic book coupon 50 is received between the electronic book coupon storage 11 and the electronic book coupon storage 22 in conformity to a protocol defined between the electronic book coupon circulating server 10 and the portable terminal 20, and is always present in these storages. Since these storages both are the tamper-resistant devices, as described above, it is feasible to prevent the injustices including the replication, falsification, etc. of the data inside the electronic book coupon by a third person.

When the portable terminal 20 acquires the electronic book coupon 50, the user of the portable terminal 20 becomes able to purchase an electronic book. When the user purchases an electronic book, the electronic book request transmitter 23 of the portable terminal 20 transmits an electronic book request to the electronic book providing server 30. The electronic book request thus transmitted is received by the electronic book request receiver 32 of the electronic book providing server 30 (U2).

When the electronic book request is received, the book data corresponding to the requested electronic book is read out of the book data storage 31. The book data 60 thus read out is encrypted by use of an encryption key A (not shown) by the book data encryptor 33. The encryption process of the book data 60 is carried out in steps of one page data unit (U31-U33).

For convenience' sake of description, let us suppose in the present embodiment that the book consists of three pages. Namely, the book data 60 consists of first page data 61, second page data 62, and third page data 63.

The encryption process in U31-U33 results in encrypting the book data 60 by the encryption key A and generating "book data 60×key A." Here "X×Y" indicates that "X" is data encrypted by use of "Y." For example, "data×key A" indicates that data is data encrypted by use of the encryption key A. The book data 60×key A indicates that the first to third page data is data encrypted by use of the encryption key A. Accordingly, book data×key A is data consisting of first page data×key A, second page data×key A, and third page data×key A.

Then the decryption key A encryptor 35 encrypts the decryption key A for decryption of book data×key A by use of an encryption key B. The encryption process of the decryption key A is carried out in units of the respective decryption keys A1, A2, and A3 (U41-U43). This results in generating encrypted data of the decryption key A for decryption of the book data 60 by use of the encryption key B, book data×key A×key B 70. The book data×key A×key B 70 is data consisting of first page data×key A×key B 71, second page data×key A×key B 72, and third page data×key A×key B 73. The first page data×key A×key B 71, second page data×key A×key B 72, and third page data×key A×key B 73 are provided with the respective decryption keys A1, A2, and A3.

The book data×key A×key B 70 is transmitted to the portable terminal 20 by the book data transmitter 34. The book data×key A×key B 70 thus transmitted is received by the book data receiver 24 of the portable terminal 20 (U5). When a readout request for readout of at least one page data unit is made for the received book data×key A 70, an electronic worth equivalent to a price according to the decryption key A for decryption of the page data requested to be read out is deducted from the electronic book coupon 50 by the electronic book coupon deductor 25.

After completion of the electronic worth deduction process about the book data×key A×key B 70, the decryption key A decryptor 29 first decrypts the decryption key A. The decryption process of the decryption key A is carried out for each of the decryption keys A1, A2, and A3 by use of the decryption key B included in the electronic book coupon 50.

Here the decryption process is executed inside the IC card as the electronic book coupon storage 22. Since the IC card is the tamper-resistant device, the decryption key A is decrypted inside the tamper-resistant device by use of the decryption key B stored in the tamper-resistant device. Accordingly, higher security can be ensured than in the case where it is decrypted inside application software such as dedicated browser software or inside hardware equipped with an IC card reader.

After completion of the decryption process of the decryption key A, then the book data decryptor 26 decrypts the book data×key A, i.e., the first page data×key A, second page data×key A, and third page data×key A. The decryption process of the book data×key A is carried out in steps of one page data unit by use of the decrypted decryption key A, as in the encryption process. (U61-U63). The decryption process is desirably executed inside the IC card as the electronic book coupon storage 22.

Then the page data decrypted by the book data decryptor 26 is displayed in a predetermined display area of the display device 20*d* shown in FIG. 3, to be read by the user of the portable terminal 20.

The above decryption process of the decryption key A is executed in conjunction with completion of the electronic worth deduction process. In other words, the decryption key A will never be decrypted unless the electronic worth deduction process is completed. Accordingly, if the remainder of the electronic worth in the electronic book coupon 50 is smaller than the price of the book data as an object of decryption, the decryption key A will not be decrypted and, as a result, the book data will not be decrypted, either. For this reason, the portable terminal 20 cannot display the book data. This imposes restrictions according to the remainder of the electronic worth on the purchase and reading of the electronic book by the user of the portable terminal 20.

Then the user of the portable terminal 20 needs to charge the electronic book coupon with additional electronic worth in order to continue the purchase and reading of the desired book data. The charging with electronic worth is started when the portable terminal 20 transmits a charge request to the electronic book coupon circulating server 10; specifically, the bill information transmitter 27 transmits the bill information about the decrypted decryption key A along with this charge request to the electronic book coupon circulating server 10 (U7). The bill information thus transmitted is received by the bill information receiver 13 to be used for generation of the collection information as described above.

Accordingly, when the user of the portable terminal 20 replenishes the electronic book coupon with an electronic worth of shortfall, the collection information DB automatically comes to reflect the information about the electronic book purchased and read by the user. This makes it feasible to securely and collectively allocate the profit according to the electronic worth used between acquisition and charging of the electronic book coupon.

In the electronic book distributing system 3 according to the present invention, as described above, the deduction process or billing in steps of one page data unit is effected on the portable terminal 20 at the time of the decryption of the book data 60. For this reason, the electronic book providing server 30 can provide the electronic book on a page-by-page basis.

Accordingly, the user of the portable terminal 20 can purchase and read only desired pages in a desired book. The user is not billed for pages that the user does not desire to purchase and read in the acquired book, so that the user can reduce the waste of the electronic book coupon. As a result, the convenience can be enhanced in use of the electronic book.

In the electronic book distributing system 3 according to the present invention, the plurality of page data units constituting the book data are encrypted unit by unit. Furthermore, the plurality of decryption keys A1, A2, and A3 for decryption of the plurality of encrypted page data units each are encrypted by the encryption key B. Namely, the page data transmitted and received between terminals is doubly encrypted. Furthermore, the plurality of decryption keys A1, A2, A3 are keys different from each other. This can enhance the security level about the book data.

Furthermore, prior to decryption of each decryption key A, the electronic worth equivalent to the price according to the number of data of the decrypted decryption key A is deducted from the electronic book coupon. For this reason, billing takes place inevitably with decryption and display of page data, whereby it is feasible to prevent unauthorized copy and unreasonable billing of page data.

The administrator of the electronic book coupon circulating server 10 can readily specify allocation receivers of profit with circulation of electronic book coupons and electronic books by referring to the electronic book IDs stored in the collection information DB 14. The administrator of the electronic book coupon circulating server 10 can also readily and quickly calculate allocations to respective allocation receivers out of the profit by referring to collected bill payments stored in the collection information DB 14.

For example, in the case where the allocation receivers of the above profit are three parties including the administrator of the electronic book coupon circulating server 10, the publisher of the electronic book, and the author of the electronic book and where the allocation ratio of the above profit to these allocation receivers is 30%, 50%, and 20%, respectively, the collected bill payment corresponding to the electronic book is allocated at the ratio of 3:5:2 to the respective allocation receivers. If the administrator of the electronic book providing server 30 is different from the publisher of the electronic book, the profit is also allocated to the administrator of the electronic book providing server 30.

It is noted that the forms described in the above embodiment are just preferred examples of the electronic book distributing system according to the present invention and that the present invention is by no means intended to be limited to these forms. For example, the above embodiment maybe arranged so that the encryption key B and the decryption key B are identical with each other (in the private-key cryptographic scheme) or different from each other (in the public-key cryptographic scheme). However, in order to ensure higher security about book data, it is desirable to adopt the public-key cryptographic scheme with easier management of keys and higher security than the private (common)-key cryptographic scheme.

The bill information was arranged to be transmitted along with the charge request, but the transmission timing of the bill information can be arbitrary; it may be transmitted in conjunction with the deduction process of electronic worth. For example, the present embodiment may be modified as follows. With a readout request for readout of first page data×key A×key B 71 and second page data×key A×key B 72 out of the first to third encrypted page data units, an electronic worth equivalent to the two decryption keys is deducted from the electronic book coupon. In conjunction therewith, the bill information in which the decryption key A1 and the decryption key A2 are described as already-used decryption keys, is transmitted to the electronic book coupon circulating server 10. Concerning billing targets in the bill information to be transmitted at this time, the number of decryption keys can be one or more, of course, and the number of book data can also be one or more.

In this configuration, the bill information is transmitted to the electronic book coupon circulating server 10 prior to the decryption of the decryption key A, and thus the bill information corresponding to the decrypted book data is completely reflected in the collection information DB. Namely, no time lag takes place between decryption of the decryption key A and update of collection information. Accordingly, the administrator of the electronic book coupon circulating server 10 becomes able to always properly and quickly allocate the profit on the basis of the up-to-date collection information.

Furthermore, the above embodiment was arranged so that the portable terminal 20 once received the full volume of one electronic book and executed the decryption process of the decryption key and the deduction process of the electronic worth (billing process) in page units, but all the processes including the reception may be arranged to be carried out in page units. Specifically, the user of the portable terminal 20 designates page units of an electronic book to be transmitted (e.g., P1-P10 of book X) and the electronic book providing server 30 transmits the page data designated, along with the decryption key A to the portable terminal 20. This arrangement can avoid transmission and reception of unnecessary page data in the case where the user of the portable terminal 20 can preliminarily determine pages that the user desires to purchase and read. Accordingly, it is feasible to reduce the communication load due to consumption of radio resources and to save the storage area of the book data.

The portable terminal does not have to be limited to the PDA or personal computer, but the terminal itself may be one without the communication function. In this case, the portable terminal can perform communication through an expansion device such as a cradle or the like.

Described last are a program for implementing the electronic book distribution technology according to the present invention and a computer-readable recording medium (hereinafter referred to simply as "recording medium") in which the program is recorded. The recording medium is a medium that can induce change states of energy such as magnetism, light, electricity, or the like according to the description contents of a program against a reading device installed as one of hardware resources of general-purpose computers or the like and that can transmit the description contents of the program to the reading device in the format of signals corresponding to the change states. Such recording media include, for example, those detachably mounted on the computers (including the portable terminals, PHS terminals, etc.) like the IC cards of UIM and others, magnetic disks, optical disks, and magnetooptical disks; and nonvolatile semiconductor memories such as HDs (Hard Disks) fixedly incorporated in the computers, firmware integrally fixed in the computers, and so on.

The above program may be configured so that part or the whole thereof is transmitted through a transmission medium such as a communication line or the like from another device to be received by the communication device of each terminal equipment according to the present invention and recorded therein. Conversely, the above program may also be configured to be transmitted from each terminal equipment according to the present invention through the transmission medium to another device to be installed therein.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A communication terminal, comprising:
an electronic value storage unit of the communication terminal, said storage unit configured to store an electronic value used in acquisition of book data containing a plurality of book data units corresponding to individual pages, along with a second decryption key used in decryption of at least one of a plurality of first decryption keys which are configured to decrypt the plurality of book data units, wherein said first and second decryption keys are different from each other;
an electronic book request transmitter configured to transmit an electronic book readout request to read out a specific page to an electronic book providing server;
a book data receiver configured to receive the book data and the plurality of first decryption keys from the providing server;
a deductor configured to deduct an electronic worth from the electronic value storage unit of the terminal, corresponding to the specific page requested to be read out by the readout request;
a first decryption key decryptor configured to decrypt the plurality of first decryption keys in increments of one first decryption key by use of a second decryption key, where said decryptor decrypts after a deduction by the deductor of the electronic worth corresponding to the specific page is completed; and
a book data decryptor configured to decrypt the plurality of book data units, in increments of one book data unit, by use of a corresponding first decryption key decrypted by the first decryption key decryptor in conjunction with a deduction of the electronic worth.

2. The communication terminal according to claim 1, further comprising an electronic value receiver configured to receive the electronic value and the second decryption key from a circulating server,
wherein the electronic value storage unit of the terminal is configured to store the electronic value and the second decryption key received by the electronic value receiver.

3. A portable terminal, comprising:
an electronic value storage unit of the portable terminal, said storage unit configured to store an electronic value used in acquisition of book data containing a plurality of book data units corresponding to individual pages, along with a second decryption key used in decryption of a plurality of first decryption keys which are used in decryption of at least one of the plurality of book data units, wherein said first and second decryption keys are different from each other;
an electronic book request transmitter configured to transmit an electronic book readout request to read out a specific page to an electronic book providing server;
a book data receiver configured to receive the book data and the plurality of first decryption keys from the providing server;
a deductor configured to deduct an electronic worth from the electronic value storage unit of the terminal, corresponding to the specific page requested to be read out;
a first decryption key decryptor configured to decrypt the plurality of first decryption keys in increments of one first decryption key by use of a second decryption key after a deduction by the deductor of the electronic worth corresponding to the specific page is completed; and a book data decryptor configured to decrypt the plurality of book data units, in increments of one book data unit, by use of a corresponding first decryption key decrypted by the first decryption key decryptor in conjunction with a deduction of the electronic worth.

4. The portable terminal according to claim 3, further comprising an electronic value receiver configured to receive the electronic value and the second decryption key from a circulating server, wherein the electronic value storage unit of the terminal is configured to store the electronic value and the second decryption key received by the electronic value receiver.

5. The portable terminal according to claim 3, wherein the book data receiver receives the book data in increments of one book data unit from the providing server.

6. The portable terminal according to claim 3, further comprising a bill information transmitter configured to transmit information for specifying the book data unit and the price, as bill information to a circulating server.

7. The portable terminal according to claim 6, wherein the bill information transmitter is configured to transmit the bill information to the circulating server in conjunction with a charge request to replenish the electronic value of the portable terminal from the circulating server.

8. The portable terminal according to claim 7, further comprising a charge information receiver configured to receive charge information to replenish the electronic value of the portable terminal from the circulating server, wherein said electronic value is replenished based on the charge information received by the charge information receiver.

9. The portable terminal according to claim 3, wherein said electronic value storage unit is comprised of a tamper-resistant device, and wherein the first decryption key decryptor is configured to decrypt the plurality of first decryption keys in increments of one first decryption key inside the electronic value storage unit.

10. An electronic book distributing method for a portable terminal, said electronic book distributing method comprising:

storing in a storage unit of the portable terminal an electronic value used in acquisition of book data containing a plurality of book data units corresponding to individual pages, along with a second decryption key used in decryption of at least one of a plurality of first decryption keys which are used in decryption of at least one of the plurality of book data units, wherein the decryption keys are different from each other;

sending a readout request from the portable terminal to a providing server, to readout a specific page of the book data from the providing server;

receiving, at the portable terminal, the book data and the plurality of first decryption keys from a providing server;

when sending the readout request, deducting, in accordance with the readout request, an electronic worth from the electronic value stored in said storage unit of the portable terminal, corresponding to the specific page requested to be read out;

first decrypting, by the portable terminal, at least one of the plurality of first decryption keys in increments of one first decryption key by use of the second decryption key after a deduction of the electronic worth, corresponding to the specific page, is completed; and decrypting the plurality of book data units, in increments of one book data unit, by use of a corresponding first decryption key decrypted by the first decryption key decryptor in conjunction with a deduction of the electronic worth.

11. An electronic book distributing computer program product, having instructions that when executed by a processor perform increments comprising:

storing in a storage unit of a portable terminal an electronic value used in acquisition of book data containing a plurality of book data units corresponding to individual pages, along with a second decryption key used in decryption of at least one of a plurality of first decryption keys which are used in decryption of at least one of the plurality of book data units, wherein the decryption keys are different from each other;

sending a readout request for readout of a specific page of the book data from a providing server;

receiving the book data and the plurality of first decryption keys from the providing server to a book data receiver of the portable terminal;

when sending the readout request corresponding to the specific page, deducting, in accordance with the readout request, an electronic worth corresponding to the specific page from the electronic value stored in said storage unit of the portable terminal;

first decrypting, by the portable terminal, the plurality of first decryption keys in increments of one first decryption key by use of the second decryption key after a deduction of the electronic worth corresponding to the specific page is completed; and decrypting the plurality of book data units, in increments of one book data unit, by use of a corresponding first decryption key decrypted by the first decryption key decryptor in conjunction with a deduction of the electronic worth.

* * * * *